United States Patent [19]

Glassman

[11] 3,729,712

[45] Apr. 24, 1973

[54] INFORMATION STORAGE AND RETRIEVAL SYSTEM

[75] Inventor: David M. Glassman, Rochester, N.Y.

[73] Assignee: Eastman Kodak Company, Rochester, N.Y.

[22] Filed: Feb. 26, 1971

[21] Appl. No.: 119,288

[52] U.S. Cl. ............ 340/172.5

[51] Int. Cl. ............ G06f 15/40

[58] Field of Search ............ 340/172.5

[56] References Cited

UNITED STATES PATENTS

| | | | |
|---|---|---|---|
| 3,593,304 | 7/1971 | Gardner | 340/172.5 |
| 3,350,695 | 10/1967 | Kaufman et al. | 340/172.5 |
| 3,533,071 | 10/1970 | Epstein | 340/172.5 |
| 3,332,071 | 7/1967 | Goldman | 340/172.5 |
| 3,626,374 | 12/1971 | Chinlund | 340/172.5 |
| 3,618,044 | 11/1971 | Cupp | 340/172.5 |

*Primary Examiner*—Paul J. Henon
*Assistant Examiner*—Paul R. Woods
*Attorney*—W. H. J. Kline, P. R. Holmes and L. F. Seebach

[57] ABSTRACT

An information storage and retrieval apparatus, using a magnetic disc and a scratch-pad memory which has the capability of storing and retrieving words of variable length, which scratch-pad memory utilizes link bits so as to link together lines in the scratch-pad memory to make longer words or phrases.

38 Claims, 22 Drawing Figures

Patented April 24, 1973 3,729,712

20 Sheets-Sheet 1

DAVID M. GLASSMAN
INVENTOR

BY Lloyd J. Seebach

AGENT

DAVID M. GLASSMAN
INVENTOR.

BY Lloyd T. [signature]

AGENT

DAVID M. GLASSMAN
INVENTOR.

BY [signature]

AGENT

DAVID M. GLASSMAN
INVENTOR.

BY Lloyd F. Seebach

AGENT

Patented April 24, 1973 3,729,712

20 Sheets-Sheet 5

DAVID M. GLASSMAN
INVENTOR.

BY Lloyd J. Seibeck

AGENT

Patented April 24, 1973

3,729,712

20 Sheets-Sheet 6

DAVID M. GLASSMAN
INVENTOR.

BY

AGENT

DAVID M. GLASSMAN
INVENTOR.

BY [signature]

AGENT

DAVID M. GLASSMAN
INVENTOR.

BY Lloyd F. Seebach

AGENT

DAVID M. GLASSMAN
INVENTOR.

BY Lloyd L. Seebach

AGENT

DAVID M. GLASSMAN
INVENTOR.

BY Lloyd F. Seebach

AGENT

DAVID M. GLASSMAN
INVENTOR.

BY Lloyd F. Seebach

AGENT

DAVID M. GLASSMAN
INVENTOR.

BY [signature]

AGENT

Patented April 24, 1973 3,729,712

20 Sheets-Sheet 13

DAVID M. GLASSMAN
INVENTOR.

BY [signature]

AGENT

DAVID M. GLASSMAN
INVENTOR.

BY [signature]

AGENT

DAVID M. GLASSMAN
INVENTOR.

BY Lloyd F. Seebach

AGENT

DAVID M. GLASSMAN
INVENTOR.

BY [signature]

AGENT

Patented April 24, 1973 3,729,712

20 Sheets-Sheet 17

DAVID M. GLASSMAN
INVENTOR.

BY Lloyd T. Seibach

AGENT

DAVID M. GLASSMAN
INVENTOR.

BY Lloyd F. Seebach

AGENT

F

DAVID M. GLASSMAN
INVENTOR.

BY Lloyd F. Seebach

AGENT

DAVID M. GLASSMAN
INVENTOR.

BY [signature]

AGENT

INFORMATION STORAGE AND RETRIEVAL SYSTEM

FIELD OF THE INVENTION

This invention relates to data handling systems, and more particularly, to an information storage and retrieval apparatus, using a magnetic disc.

DESCRIPTION OF THE PRIOR ART

The need for specialized storage and retrieval systems to handle information conventionally found in abstracts, texts, documents, patents, etc., has resulted in various systems and techniques for gaining rapid access to this information. Analysis and comparison of current storage and retrieval techniques indicate the primary reasons for using computers in such systems are the availability of large memories for storage and manipulation and the capability of performing high-speed comparisons.

In prior art data storage and retrieval systems there are disclosed information search and retrieval arrangements wherein the comparison of stored information data with an interrogation request is accomplished by means of data cards utilizing card-to-card comparison. The information cards and the interrogation cards are punched in a complementary fashion, and a light source or other suitable means is used to scan the data cards. A comparison match of information data and request data is indicated by a black-out condition, and the matching data records are then sorted for the non-matching data records by suitable mechanical means. An inherent shortcoming of this type of information retrieval system is the need for mechanical sorting apparatus which necessarily restricts the information retrieval speed of the machine, and thus increases the cost of operation.

Another shortcoming of prior art data storage and retrieval arrangements resides in the means for comparison of alphanumeric characters in the stored information and the interrogation request. When punched cards, coded in a Hollerith or variable number elements code, are used for the interrogation request, ambiguities or errors are introduced in the information retrieved. For example, such ambiguities are introduced when punched cards are coded to contain alphanumeric characters, and an output may be recorded when the alphabetic character of the punched card request is compared to the numeric character of the stored information. In some instances, special arrangements are utilized to convert the Hollerith code in a fixed number element code prior to the comparison of the stored information and the interrogation request.

An additional inadequacy of prior art data retrieval systems resides in the fact that after the information comparison is completed, cards bearing the selected information must be sorted. In addition, the selected cards must be decoded or translated from the machine language to render the information usable.

Another shortcoming of prior art information search and retrieval systems of the card comparison type is their inability to recognize blanks between words of the stored information, and consequently their inability to efficiently handle natural language. Thus, in prior art devices, a comparison match would be indicated when the request corresponds to the last characters of a word and the first characters of a subsequent word resulting in the retrieval of excessive amounts of unrelated information. The inability to utilize natural language in the automation of information storage and retrieval is a problem that has long confronted the information handling industry.

Still another inadequacy of prior art systems is in the use of special codes for interrogation request information. This necessitates extensive programming by the use of plug-board wiring when it is desired to operate the system in different modes.

DEFINITION OF TERMS USED IN DESCRIPTION OF THE PREFERRED EMBODIMENTS

Over the course of the years and during the period when the automation of information storage and retrieval was in its embryo stage, there arose the need for a specialized terminology peculiar to the information handling industry. While some of this terminology has been carried over from other branches of the computer industry, others have evolved as a result of the need to identify the peculiar problems with which personnel were confronted in the development of information storage and retrieval systems. The following definitions are helpful in describing the operation of the information storage and retrieval system to be described hereinafter:

1. Information File — The totality of all information stored on a permanent or semipermanent storage means such as a removable disc or cartridge. The file consists of a multiplicity of "records." These records need not be associated with a single topic of information.

2. Record — A sequential number of data blocks used to identify a particular item of information. A record consists of a "title block" and any number of "-descriptor blocks."

3. Data Block — Any number of alphanumeric characters up to a maximum number that is determined by certain system constraints.

4. Title Block — The first data block in a record. A special character, "·", hereinafter designated as the "dot code," is used as the first character of this data block to identify said data block as the title block.

5. Descriptor Block — All data blocks not containing the dot code as its first character.

6. Descriptor — A single line of alphanumeric characters that in conjunction with other descriptors serve to identify or describe a record. A descriptor may be either in natural language or in any arbitrary alphanumeric code. Both types of descriptors may be used within any single record. A descriptor is considered to be subdivided into one or more five character "words," although all "words" forming a single descriptor follow directly upon one another with no gaps therebetween.

7. Search Descriptor — A descriptor that is entered into the system when entering a search request.

8. Search Request — A logical combination of search descriptors used to identify the type of information that the searcher wishes to find contained within a record.

9. Conjunction — That portion of a search request where two or more descriptors must be present within at least one individual record to satisfy the criteria for a conjunctional type request. To illustrate, if a search is conducted for those documents containing information about magnetic tape storage, the request is formulated as a conjunction (MAGNETIC and TAPE and STORAGE) to satisfy the request criteria.

10. Disjunction — The case where either one single descriptor or another single descriptor must be present within at least one individual record to satisfy the disjunctional criteria of a request. For example, a search request for documents containing information concerning pulse circuits or digital techniques is formulated as a disjunctional request since information about either subject satisfies the request criteria. The request would appear as: PULSE CIRCUITS or DIGITAL TECHNIQUES.

11. Negation — The case where the request criteria specifies negation of one or more descriptor words appearing within at least one individual record. An example of a search requiring negation is a request for documents containing information about projectors but not about cameras. The request is formulated as: PROJECTOR but not CAMERA — specifying negation of the descriptor CAMERA to satisfy the request criteria.

12. Variable Suffix — The case where a root or a common part of a descriptor word or words appearing within at least one individual record satisfies a request. For example, if a search is conducted on the descriptor word, TRANSISTOR, the complete word must be matched to satisfy the request criteria. However, the variable suffix search capability enables a search to be conducted solely on the common part TRANS+. Thus, the request criteria is satisfied by TRANSISTOR, TRANSIT, TRANSFER, TRANSFORMER, etc.

13. Partial Search Request Satisfaction — The case where, for example, N out of M search request requirements are present within one individual record where M equals the total search request criteria and N equals the search request criteria which would satisfy the partial search request. Illustrative of a search requiring partial satisfaction is a request for documents containing information about one or more of the following subjects: radar, radio, infrared, and computers. Such a request is formulated: RADAR and RADIO and INFRARED and COMPUTERS.

Every time a search descriptor is entered into the system, such as by entering an OP code (defined at definition No. 17) and search descriptor, the number of search descriptors requested is indicated. A new number indicative of the number of descriptors to be matched, less than the original number request, may now be entered. That is, if N = desired number of search descriptors to be found and M = number of search descriptors entered, then N <M. If N is set equal to 1, then an "or" type of search will be performed. For example, if the entered descriptors are "A," "B," "C," "D," then if any one of these descriptors is found, the search request will be satisfied. If 1<N<M, then more complex logical searches can be made. For example: If the search descriptors are "A," "B," "C," "D," N = 2 (M = 4), then the following combinations of search descriptors will constitute an answer:

"A" and "B"
"A" and "C"
"C" and "D"
"B" and "C"
"A" and "D"
"B" and "D"

A further extension of this technique allows a search of the logical "product of sums" type. That is, given "A," "B," "C," "D," and the following combination is desired (A or B) and (C or D), that is, a record must contain either descriptors A or B and must also have either C or D to be listed as an answer. This search is performed as in the pervious example with two additional searches.

(a) Enter A, B, C, D and search N = 2.
(b) Enter A, B and search (M = 2)
(c) Enter C, D and search (M = 2)
(d) Remove the results of searches 1 and 3 from the result of search 1 and the original request (A or B) and (C or D) has been satisfied.

14. "Character Don't Care" — It may often be desired or even required to retrieve information which falls within a certain numerical range. This is achieved in the search comparator by the use of a "Character Don't Care", "/", character. For example, if the information file is to be searched for all data regarding certain events that happened between 1950 and 1959, the search request would be instrumented as 195/ with the "Character Don't Care" character being positioned after the first three numerical characters. Thus, all information corresponding to the request which occured between 1950 and 1959 would be retrieved.

Another use of the "Character Don't Care" character occurs when the particular spelling of a word or formula representations are unknown or not essential. For example, if the information file is to be searched for the name Johnson and there is some doubt as to whether the name is spelled Johnsen, Johnson, or Johnsin, etc., the search request would be formulated JOHNS/N with the "Character Don't Care" character being positioned in place of the letter in doubt.

15. Natural Language — When referring to the capability of the invention described herein to handle ordinary or natural language, it is meant that the machine has the capability to search a complete text, abstract, document, patent description, etc., which is stored in the information file, and is not handicapped by the fact that when the comparison process is taking place, it will be unable to distinguish blanks between words. In addition, the term natural language refers to the capability to recognize individual words, be they numerics, or alphabetics, or combinations such as alphanumerics. Thus, it can readily be seen that the discrimination capability inherent in the information storage and retrieval system described herein enables reading an entire test which contains numerical characters, aliphabetical characters, or combinations of either and can include as well, formula representation.

16. Search Mode — After the operator has totally specified the search request, all that remains is to select the search mode to be used. Usually the "Search Only" mode is used merely to determine the number of records answering the search request. Once a reasonable number of records are indicated as answering the request, the "Print Title Only" mode is usually used next as it takes the least time of the two printout modes to present the retrieved information. At this point, only a few records will probably be of interest and by entering the title blocks as search requests and using the "-Print All" mode, only those records of real interest will be printed in their entirety.

17. Logical Operators — Each search descriptor is preceded by a logical operator, or OP CODE. If the records have been properly formulated, more than one OP CODE can be used within a single descriptor. The available OP CODES are as follows:

(a) = — This asks if the search descriptor is "equal to," or an exact match with, the descriptor block. For example, "=birth=1935" would retrieve all documents containing the descriptors "birth" and "1935"

(b) ≠ — This asks for all descriptor blocks that are "not equal to" the search descriptor. This is used only with numeric descriptors. For example, "=birth ≠ 1935" would retrieve all documents containing the descriptor "birth," but none containing the descriptor "1935."

(c) > — This asks for all descriptor blocks "greater than" the search descriptor; this is used only with numeric descriptors. For example, "=birth> 1935" would yield all documents containing the descriptor words "birth, 1936," "birth, 1937," "-birth, 1938," etc.

(d) ≥ — This asks for all descriptor blocks "greater than or equal to" the search descriptor; this is used only with numeric descriptors. For example, "=birth ≥ 1935" would yield documents with the descriptors "birth, 1935," "birth, 1936," "birth, 1937," etc.

(e) < — This asks for all descriptor blocks "less than" the search descriptor; this is used only with numeric descriptors. For example, "birth<1935" would yield documents with the descriptors "birth, 1934," "birth, 1933," "birth, 1932," etc.

(f) ≤ — This asks for all descriptor blocks "less than or equal to" the search descriptor; this is only used with numeric descriptors. For example, "=birth ≤ 1935" would yield documents with descriptors "birth, 1935", "birth, 1934," "birth, 1933," etc.

(g) ≢ — This tells the search logic that the specified descriptor is located and the record that contains this descriptor is to be precluded from the answers to the search request.

SUMMARY OF THE INVENTION

The invention relates to an information storage and retrieval apparatus using a scratch pad memory, said apparatus having the capability of storing and retrieving words of variable length, and which scratch pad memory utilizes link bits so as to link together lines in the scratch-pad memory to make longer words or phrases. A device as complex as the information storage and retrieval system described herein would present a formidable task to one trying to understand its functions, if the circuit schematics were the only graphical aids available. For this reason, reference is first made to block or logical diagrams, while a discussion of circuits within the blocks is reserved to a later section.

Hereinafter, in this specification, whenever reference is made to a circuit terminal, conductor or the like as being raised to a positive value, this does not necessarily mean that the point in question is at a positive or negative potential in an absolute sense, but only more positive or more negative relative to its previous state. This principal also applies to any description wherein positive or negative pulses are referred to.

One object of this invention is to provide a natural language search and retrieval system without the need of machine media or machine language between the storage system and the retrieval system. Requests are formulated in the same language as the information which is returned to the requestor.

Another object of this invention is to provide an improved information search and retrieval system for the comparison of request data and stored information.

Still another object of this invention is to provide an improved information search and retrieval system capable of information comparisons at higher speeds than speeds of the prior art systems.

A further object of this invention is to provide an information search and retrieval system where the information compiled consists of indexed information stored in natural language and the requests are formulated in exactly the same language as the information filed.

Yet another object of the invention is to provide an information search and retrieval system where the user has a minimum of format restrictions placed upon him.

Still another object of this invention is to provide an information search and retrieval system that is not restricted to fixed length records.

A further object of this invention is to provide an information search and retrieval system that can automatically actuate most types of document image retrieval systems.

Yet another object of this invention is to provide an information search and retrieval system that can easily be updated by adding new records at the end of the existing records.

Yet another object of this invention is to provide an information search and retrieval system that can have multiple conditions imposed upon a single search question.

Still a further object of this invention is to provide an information search and retrieval system that will have as one of its logical operators an exclusion operator. That is, if a given descriptor is found, then the document is not desired.

The above objects of the invention are attained by a natural language search and retrieval system that uses a coding and decoding means such as an electric typewriter in combination with an information storage file such as a magnetic disc and a comparator using digital search logic.

In accordance with another feature of the invention, an improvement for an apparatus is described, said apparatus having a head for recording information signals on, and reading information signals from, a storage medium having a plurality of continuous signal recording tracks, said tracks each having a track mark signifying the beginning of recorded data for that track, and being sufficiently long to store in non-overlapping relation a predetermined number of recorded signals representative of data bits. Such apparatus contains a device for locating portions on said tracks upon which signals representative of additional data blocks can be recorded in non-overlapping relation to each other and to other recorded signals on said track, said device comprising means for moving the tracks and head relative to each other; means operatively associated with said head for counting from the track mark on one track the data blocks stored on said one track; means operatively associated with said head for recounting from the track mark on said one track, the data blocks stored on said one track; means operatively associated with said head and effective when the recounting means reaches said counted number for recording signals representative of the additional data groups on said one track as the head and track continues to move relative to each other when enough room remains on said one track to record a predetermined number of signals representative of data bits; and means operatively associated with said head and effective when the recounting means reaches said counted number for stepping said head to the next track and recording signals representative of data blocks thereon when enough room does not remain on said previous track to record a predetermined number of signals representative of data bits.

In accordance with another feature of the invention, an information retrieval system is described having a memory for storing data with which stored information is to be compared, said memory having a predetermined capacity of information bits per line, and a predetermined number of information lines. The memory selectively links at least a pair of said lines together so as to utilize said linked together lines for multiple variable length units of information.

In accordance with still another form of the invention, the complete text, abstract or indexed information is assigned identifying characters or accession numbers and the information together with its identifying characters is stored on a magnetic disc. The system is queried or interrogated for the desired information by a request of logically connected search words written in the same language as stored information. The interrogation request comprises a direct input, such as from a typewriter. Upon a successful match or comparison of the request information and the stored information, either the identifying characters, the complete text, or the abstract may be printed out, depending on a preselected setting of the controls.

In accordance with another feature of the invention, an information storage and retrieval system is described which executes a comparative process between the interrogation request and the information file as well as performs the logical functions specified by the request criteria. The system is capable of conducting various types of searches, including conjunctions, disjunctions, negations, variable suffix, partial request satisfaction, information dissemination and multiple searches.

DESCRIPTION OF THE DRAWINGS

Reference is now made to the accompanying drawings wherein like numerals and characters designate like parts and wherein the symbols used designate circuitry having substantially the same mode of operation.

GLOSSARY — COMMANDS AND SIGNALS

Figure 1:
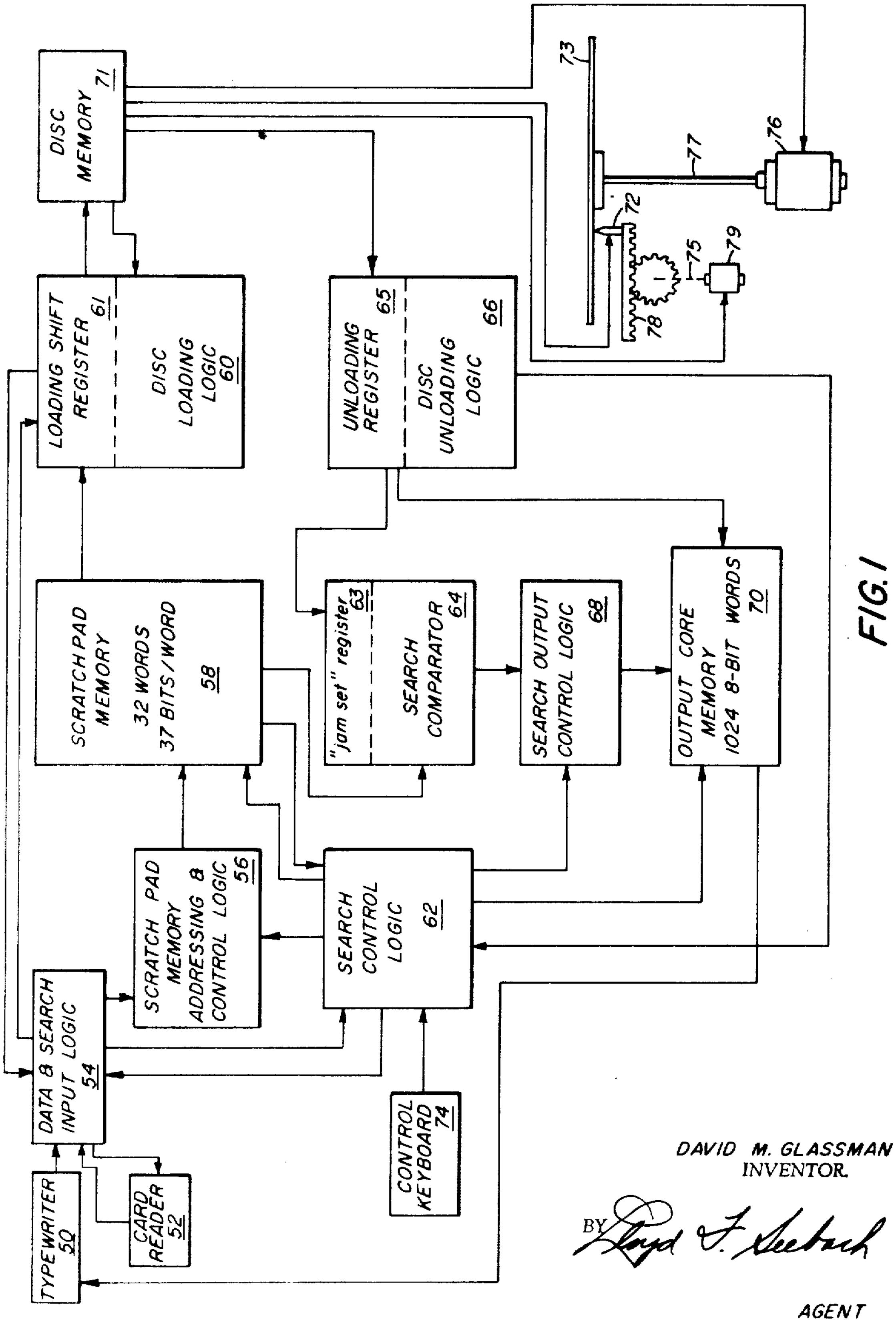
FIG. 1 is a block diagram of the various major elements, both mechanical and electronic, which are embodied in the invention.

In order to better understand the description which follows as well as the abbreviations used in the drawings in conjunction with the logic circuitry, the following glossary of commands and signals is provided:

| ABBREVIATION | COMMAND and/or SIGNAL (Drwg) |
|---|---|
| AEQB | A EQual to B (10*c*, 12*b*) |
| AGB | A Greater than B (10*c*, 12*b*) |
| AGEB | A Greater or Equal to B (10*c*, 12*b*) |
| AIADC | Scratch pad memory clock (7, 8*b*, 10*c*) |
| ALB | A Less than B (10*c*, 12*b*) |
| ALEB | A Less than or Equal to B (10*c*, 12*b*) |
| ANEB | A Not Equal to B (10*c*, 12*b*) |
| AUSTP | AUtomatic head STeP (4*b*, 14) |
| BO, B1,---29 | Scratch pad memory data bits (2) |
| BCDC1, BCDC---6 | Binary Coded Decimal Character 1 (8*b*) |
| BDBO, BDBO1---8 | Core memory output bits (15*b*) |
| BEOD | Buffered End Of Descriptor (12*a*, 12*b*) |
| BL | Buffered Link (12*b*) |
| BNEQE | But Not EQual Enable |

(10c, 13)

| | |
|---|---|
| BOCBO, BOCB1---3 | Buffered Op Code Bit O (10c ) |
| BPRT | Buffered PRint (4a, 15a) |
| C1CDC, C2CDC,--- | Character 1 Character Don't Care (10a, 10b, 11) |
| C1HOC, C2HOC,--- | Character 1 High Order Comparison (10a, 10b, 11) |
| C1P, C2P,--- | Character 1 character Prefix (10b, 11) |
| CDP | Count Documents Printed (4a, 13) |
| CLADC | CLean ADdress Counter (7, 8b) |
| CLADCA' | Word Address Clear A (8b, 12b) |
| CLADR | CLean core ADdress Register (15a, 15b) |
| CLDOR | CLean core Data Output Register (15a, 15b) |
| CMSTR | CoMpare STRobe (12a, 13) |
| CP1-CP5 | Comparator Prefix request (10b, 13) |
| CRST | Counter ReSeT (5a, 5b) |
| CWEOD | Command Write End Of Descriptor (8a, 12a, 14) |
| CWSOD | Command Write Start Of Descriptor (8a, 12a) |
| DBO, DB1,---29 | Data Bit 0----29 (4a, 13, 15a) |
| DDD' | Dot DetecteD (13, 15a) |
| DDG | Delayed Data Gap (12a, 15a) |
| DG | Data Gap (5a, 12a, 12b) |
| DGRST | Data Gap ReSeT (13, 15a, 15b) |
| DOCHO | DOCument Hit Out (13, 14) |
| DR | Disc Ready (4b, 5a, 5b) |
| DRRST | Data Register ReSeT (5b, 13, 14) |
| DSCL | DeScriptor hit CLock (13, 14) |
| EDAE | Enter DatA Enable (8a, 8b) |
| EDTA | Enter DaTA (4a, 6) |
| EODB | End Of Descriptor Bit (5a, 12a) |
| EQOPC | EQual to OP Code (10c, 12b) |
| ESRCH | Enter SeaRCH (4a) |
| ETM | End of Track Mark (4b, 5a) |
| GEOPC | Greater than or Equal to OP Code (10c, 12b) |
| GOPC | Greater than OP Code (10c, 12b) |
| HC1CL, HC2CL | Hit CLock (4a, 13, 14) |
| HOM | HOMe (4b) |
| HRDT | Hold Register Data Transfer (9, 12a, 12b, 13) |
| HRR | Hold Register Reset (5b, 12b, 15a) |
| HSTR | Hit STRoke (12b, 13) |
| IWDB | Inhibit Write Data Block (4a, 6, 8a, 8b) |
| LDAE | Load DAta Enable (5a) |
| LEOPC | Less than or Equal to OP Code (10c, 12b) |
| LEPO | Less than or Equal oP Code |
| LOPC | Less than OP Code (10 c, 12b) |
| LWDSRH | Last WorD of SeaRcH (12, 15a) |
| MAC | Memory Address Clock (5a, 8b) |
| MAE | Memory Address Enable (8b, 12a, 12b) |
| MRST | Manual ReSeT (4a, 8a, 14, 15b) |
| MZ | Memory Zero (8a, 8b, 12a, 14) |
| NEOPC | Not Equal to OP Code (10c, 12b) |
| OCB0, OCB1---3 | Op Code Bits (10c) |
| PBRWC1 | Power Buffered Read Write Clock 1 (9, 12a) |
| PDCE | Prefix Don't Care Enable (11, 12b) |
| $P_1, P_2$ | Shift Register Parity Bit (5a) |
| PRSA, PRSB | Loading register reset (5a) |
| PRT | PRinT (14) |
| PRTA | PRinT All (4a) |
| PRTAO | PRinT Address Only (4a) |
| PRTAB | PRinT All Buffered (15a) |
| RES' | RESet output (15a, 15b) |
| RL | Read Link (7, 12b) |
| RSOD | Read Start Of Descriptor (12a) |
| RSTC | ReSeT Clock (8a) |
| RSTS | ReSet Track Start (5a, 5b, 8a) |
| RWC | Read Write Clock (5a, 8b) |
| RWCB | Read Write Clock Buffered (15a) |
| SCC | Search Control Counter (12a, 13) |
| SE | Search Enable (4b, 12a) |
| SPB0, SPB1---29 | Scratch Pad Bit (10a, 10b) |
| SPE | Set Print Enable (4a, 13, 14) |
| SPSTR | SPecial STRobe (12b, 15a) |
| SRCH | SeaRCH |
| SRCHP | SeaRCH and Print (4a) |
| SRCHPA | SeaRCH and Print All (4a, 5a) |
| SRRST | Serial Register ReSeT |
| SSE | Set Search Enable (4a, 13, 14) |
| STRC | STart Read Cycle (15b) |
| STSRCH | STop SeaRCH (4a) |
| TA | Track Active (12a) |
| TFSTI | Track Filled STep In (4b, 5b, 6) |
| TM | Track Mark (5a) |
| TO, TO1 | Track Origin (5a, 5b, 9) |
| TOCR | Typewriter Carriage Return (14, 15b) |
| TPO | TyPe Out (4a, 8a, 8b, 12a, 13, 15a) |
| TSE | Track Search Enable (4b, 8b, 12b, 13, 15a) |
| WCOK | Word Comparison OK (12b, 13) |
| WDB | Write Data Block (6, 8b) |
| We1, WE2,--- | Write Enable (12a) |
| WEOD | Write End Of Descriptor (12a) |
| WF | Write Format (5a, 5b) |
| WLB | X Link Bit (12b) |
| WSOD | Write Start of Descriptor (12a) |
| X35STR | STRobe timed by X35 Counter (4a, 12a, 15a) |

DESCRIPTION OF THE PREFERRED EMBODIMENT

FIG. 1 shows a general block diagram of the overall information search and retrieval system embodying this invention. The system comprises typewriter 50, card reader 52, data search and input logic 54, scratch-pad memory addressing and control logic 56, scratch-pad memory 58, disc loading logic 60, search control logic 62, search comparator 64, disc unloading logic 66, search output control logic 68, output core memory 70, disc memory system 71, read/write head 72, disc 73, and control keyboard 74. Read/write head 72 is attached to rack and pinion assembly 78. Head stepper motor 74 is operatively attached to rack and pinion assembly 78 by drive shaft 75. Disc driver motor 76 is operatively attached to disc 73 by drive shaft 77. The various elements of the system are coupled together so that signals may be sent in the proper manner through them. The nature of these signals and their timing will be discussed in greater detail hereinafter.

The overall operation of the information storage and retrieval system embodying this invention will be better understood by the following general description. The information storage and retrieval system embodying this invention permits storing and/or retrieval of information by merely typing the desired information (e.g., descriptor words) in conversational English on a coding and decoding type of electric typewriter 50. The main storage element used in a 130-track magnetic disc 73 having a total capacity of approximately 6.5 million bits per disc side. Information is read in and out of disc 73 at a 1 MHz bit rate. Thus, even considering the time required for read/write head 72 To shift from track to track, the entire stored information can be searched in an extremely short time. The identification of those records which satisfy the typewritten search descriptor words will be automatically typed out during the search and print operation.

In addition to disc 73, the system includes a scratch pad memory 58 for temporarily storing the information either as it is typed by the operator on typewriter 50.

The scratch pad memory 58 has a capacity sufficient to store two full 80 character lines of typewritten data.

A second auxiliary memory in the form of a jam set register 63 is included in search comparator 64 and is provided for temporarily storing information read out from disc 73 during search operations. As discussed hereinbelow, the information temporarily stored in the jam set register 63 is compared with that of the scratch pad memory 58 to determine when a record "hit" occurs, i.e., when a comparison agrees.

Data search and input logic 54, scratch paid addressing and control logic 56, disc loading logic 60, search control logic 62, disc unloading logic 66, and search output control logic 68 control the transferring of the information between the various storage elements, as well as controlling the proper sequence of operation, as described in more detail hereinbelow.

As indicated hereinabove, information relative to each record is stored on disc 73 having 130 tracks, each track having a bit capacity of approximately 50,000 bits. Each character is represented by a six-bit binary digital code plus a seventh parity bit. Table 1 shows the Binary Coded Decimal (BCD) representation used in this system.

TABLE I

| | | Bit | | | | | Used Upper Case Does Not Go To Disc |
|---|---|---|---|---|---|---|---|
| $b_6$ | $b_5$ | $b_4$ | $b_3$ | $b_2$ | $b_1$ | Lower Case | |
| 0 | 0 | 0 | 0 | 0 | 0 | illegal character | |
| 0 | 0 | 0 | 0 | 0 | 1 | A | |
| 0 | 0 | 0 | 0 | 1 | 0 | B | |
| 0 | 0 | 0 | 0 | 1 | 1 | C | |
| 0 | 0 | 0 | 1 | 0 | 0 | D | |
| 0 | 0 | 0 | 1 | 0 | 1 | E | |
| 0 | 0 | 0 | 1 | 1 | 0 | F | |
| 0 | 0 | 0 | 1 | 1 | 1 | G | |
| 0 | 0 | 1 | 0 | 0 | 0 | H | |
| 0 | 0 | 1 | 0 | 0 | 1 | I | |
| 0 | 0 | 1 | 0 | 1 | 0 | + | |
| 0 | 0 | 1 | 0 | 1 | 1 | .(period) | |
| 0 | 1 | 0 | 0 | 0 | 0 | illegal character | |
| 0 | 1 | 0 | 0 | 0 | 1 | J | |
| 0 | 1 | 0 | 0 | 1 | 0 | K | |
| 0 | 1 | 0 | 0 | 1 | 1 | L | |
| 0 | 1 | 0 | 1 | 0 | 0 | M | |
| 0 | 1 | 0 | 1 | 0 | 1 | N | |
| 0 | 1 | 0 | 1 | 1 | 0 | O | |
| 0 | 1 | 0 | 1 | 1 | 1 | P | |
| 0 | 1 | 1 | 0 | 0 | 0 | Q | |
| 0 | 1 | 1 | 0 | 0 | 1 | R | |
| 0 | 1 | 1 | 0 | 1 | 0 | — (dash) | |
| 0 | 1 | 1 | 0 | 1 | 1 | ; | |
| 1 | 0 | 0 | 0 | 0 | 0 | illegal code | |
| 1 | 0 | 0 | 0 | 0 | 1 | l | |
| 1 | 0 | 0 | 0 | 1 | 0 | S | |
| 1 | 0 | 0 | 0 | 1 | 1 | T | |
| 1 | 0 | 0 | 1 | 0 | 0 | U | |
| 1 | 0 | 0 | 1 | 0 | 1 | V | |
| 1 | 0 | 0 | 1 | 1 | 0 | W | |
| 1 | 0 | 0 | 1 | 1 | 1 | X | |
| 1 | 0 | 1 | 0 | 0 | 0 | Y | |
| 1 | 0 | 1 | 0 | 0 | 1 | Z | |
| 1 | 0 | 1 | 0 | 1 | 0 | · dot code | * |
| 1 | 0 | 1 | 0 | 1 | 1 | , | |
| 1 | 1 | 0 | 0 | 0 | 0 | 0 | |
| 1 | 1 | 0 | 0 | 0 | 1 | 1 | |
| 1 | 1 | 0 | 0 | 1 | 0 | 2 | |
| 1 | 1 | 0 | 0 | 1 | 1 | 3 | |
| 1 | 1 | 0 | 1 | 0 | 0 | 4 | = |
| 1 | 1 | 0 | 1 | 0 | 1 | 5 | ≤ |
| 1 | 1 | 0 | 1 | 1 | 0 | 6 | ≥ |
| 1 | 1 | 0 | 1 | 1 | 1 | 7 | < |
| 1 | 1 | 1 | 0 | 0 | 0 | 8 | > |
| 1 | 1 | 1 | 0 | 0 | 1 | 9 | |
| 1 | 1 | 1 | 0 | 1 | 0 | space | |
| 1 | 1 | 1 | 0 | 1 | 1 | # | ‡ |

Information for each record is stored on disc 73 as follows: First a title block (the first character of which is always the "dot code" to distinguish the title block from the other descriptors which follow); then a 15-microsecond data gap (erased track); then a descriptor (up to 80 characters in length); another 15-microsecond data gap; the next descriptor, etc. Data for the next record follows immediately after the 15-microsecond data gap at the end of the last descriptor. For reasons discussed in detail hereinbelow, each descriptor is considered to be subdivided into one or more five character "words," although all "words" forming a single descriptor follow directly upon one another with no gaps therebetween.

At the beginning of each track is a completely erased "Track Origin" region of predetermined effective length (e.g., equivalent to 300-microseconds or 300 bits) followed by a "Track Mark" of predetermined length. This is followed by a 15-microsecond data gap and then by the "dot code," etc., for the first record.

Each track is substantially completed, before recording on the next track is started. The change-over from one track to another is always made between descriptors — that is, a single descriptor is never partly on one track and partly on another. However, all descriptors for a single document need not be on the same track — some can be at the end of one track and the next ones at the beginning of the next track.

The following is a description of the recording mode when a typewriter 50 is used as the input. Referring back to FIG. 1, the read/write head 72 is stepped by head stepper motor 74 through drive shaft 75 and rack and pinion assembly 78 to the outermost track of disc 73, and steps in, successively interrogating each track until it finds a formatted track, on which no data is recorded. At the beginning of each formatted track is a completely erased "Track Origin" region of predetermined effective length (e.g., equivalent to 300-microseconds or 300 bits) followed by a "Track Mark" of predetermined length. This is followed by a 15-microsecond data gap and the remainder of the track is filled with a solid area of "1's". The read/write head 72 then steps back out one track. As disc 73 rotates, the track origin and track mark are sensed, and all data gaps present on the track are counted. On the next revolution of disc 73, a counter in disc loading logic 60, which will be described in more detail hereinafter, is caused to count down so that it will return to zero when the data gap preceding the last recorded data is sensed. Recording of the new data will start immediately following the next data group, provided that there is sufficient space (as determined by a separate counter in disc loading logic 60) remaining to accommodate the next descriptor. If not, read/write head 72 is stepped to the next track on disc 73, which is a formatted track, and therefore has no data stored thereupon, and begins the recording sequence.

In recording, the typewritter 50 is operated so that each descriptor (and title block) is typed on a separate typewritten line. Each character is entered into the scratch-pad memory 58, as it is typed, the first five characters being entered in the "zero" word position, the next five characters in the "one" word position, etc. The data and search input logic 54 controls the sequence of loading of characters into scratch-pad memory 58. When the carriage return key of typewriter 50 is operated, a cycle starts in which first the "zero" word is transferred into the loading shift register 61 of disc loading logic 60 where the parity bits are added so that the word is now 35 bits in length. The bits are then fed in sequence through disc memory system 71 to read/write head 72, and recorded on disc 73. During the fraction of a microsecond interval following the recording of the 35th bit, the next word is fed from the scratch pad memory 58, in parallel, to the now empty loading shift register 61 of disc loading logic 60 and the cycle is repeated until all words of the descriptor which have been typed on that particular line have been recorded and the scratch pad memory 58 is empty. When the last word of the descriptor has been recorded, disc memory system 71 generates signals that will produce a data gap. This entire procedure requires but a small fraction of a second since the maximum descriptor length is 80 characters (the equivalent of 2,800 microseconds recording time), plus the 15-microsecond data gaps. Thus, well before the typist is even ready to start typing the next line of descriptor data on typewriter 50, the information storage and retrieval system is ready for a new recording cycle.

Figure 2:
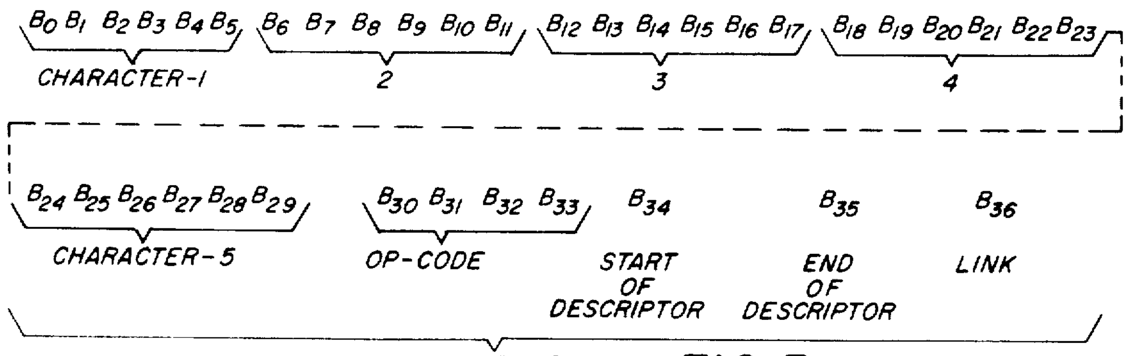
FIG. 2 is a diagrammatic presentation of a single word as manifested in the scratch pad memory.

In order to search for data stored on disc 73, the operator types the descriptors desired on typewriter 50, each on its own line, and each preceded by an operation code, (OP CODE), such as "equal to," or "greater than." These operators are all typed in upper-case, while descriptors are all typed in lower case. Thus, when the shift key of typewriter 50 is actuated at the beginning of a descriptor sequence, a startof-descriptor (S.O.D.) signal or bit is written into a predetermined bit-position of the scratch pad memory 58. A logical operator can be inserted at any place within a single question. This allows the operator to ask for a search such as "=birth>1935." The only external restriction is that the original information file loaded on disc 73 is written in the same manner. Inasmuch as the logic performs its searches on five characters at a time, the internal logic of the system will automatically space the characters properly if such a split logical search is requested. The scratch pad memory 58, in addition to the 30 bit positions required for each "word," also includes certain bit positions specifically assigned or reserved for entry of the "operator", and the special signals such as S.O.D. (start of descriptor), E.O.D. (end of descriptor), and L.B. (link bit), the latter to be described hereinbelow. FIG. 2 shows the organization of a single word in scratch pad memory 58. Each character consists of six bits. Each word has a four bit "OP CODE," and space for a "start of descriptor" bit, an "end of descriptor" bit, and a "link" bit.

The scratch paid memory 58 has a total capacity of 32 five-character words (plus the above-mentioned extra bits associated with each word). This establishes the total number of descriptors for a particular search, and scratch pad memory 58 will normally accommodate several descriptors, since few descriptors will be more than three or four "words" (15–20 characters) in length.

The general searching technique is as follows. Starting at the outside track of disc 73, each five-character "word" on that track is compared, in turn, with each five-character "word" stored in the scratch pad memory 58. Assume, for simplicity of description, that the search is for an exact match and that the operation code for each descriptor will therefore be "equals," (=). Not only must each "word" match, but the "-word" order in a complete descriptor must be exactly the same. Thus, "ELECTRIC" on the disc 73 will not show a match with "PHOTOELECTRIC" in the scratch pad memory 58 since "ELECT" on the disc 73 is word "0" in the scratch pad memory 58 it would be word "1." This is where the S.O.D. and link bits come into play as explained hereinbelow.

As the disc 73 revolves, the first word after the first data gap will be read bit-by-bit into a serial input shift loading register 65 which is part of disc unloading logic 66. Immediately at the end of the 35 microsecond time required for this operation, the 30 data bits (excluding the parity bits) will be transferred in parallel into a jam-set register 63 which is part of search comparator 64 where the significant bits will be retained for substantially 35 microseconds. By the time the 36th bit from the disc 73 is ready to be sensed, the loading register 65 will therefore have been emptied and ready to receive the first bit of the next "word".

Beginning immediately after the 30 bits (derived from disc 73) have been transferred into the jam-set register 63, they will be compared in parallel at one microsecond intervals with each of up to 32 "words" stored in the scratch pad memory 58. For a "hit" on any word, not only must the five characters of the word in the scratch pad memory 58 correspond exactly to the five characters of the word in the jam-set register 63, but there must also be (1), either a S.O.D. bit *or* a link bit in the appropriate bit position of the scratch pad memory 58, and (2) the "word" number of the two being compared must be the same. If a "word-hit" is found, a link bit will be inserted in the proper bit position of the *next* word in the scratch pad memory 58, so as to make it ready for comparison with the next word from disc memory 72. This operation will be repeated, "word"-by-"word," until each descriptor stored on the disc 73 has been compared with each descriptor stored in the scratch pad memory 58. When an end of descriptor (E.O.D.) bit is sensed in the scratch pad memory 58, a check is made to see if the last word of the disc 73 descriptor is the one with which the comparison was made. If it was, and all other necessary conditions have been met, then a descriptor hit is recorded in a counter. This count is compared to the counter that has stored the number of search requests asked for. When the two counts are equal, then a record hit is recorded. It should be noted that the counter that records the number of search requests can be set to a number lower than the actual number of requests so that a majority type of search may be implemented. Thus, the range of search logic is from a simple logical OR to a complete logical AND of all requested descriptors. If a "But-Not" condition is requested and an equality match is found for that descriptor, the counter holding the number of record hits will be reset and held in a reset condition until the end of that record, thus preventing a hit on that record. If the unit is set for "search" operations, it will count the total number of "hits" and display the total at the end of the operation. If, instead, it is set for "print," as soon as a "hit" is sensed, a control pulse will be generated which will interrupt the search, and will cause the file identification data to be fed to typewriter 50 and typed. As soon as the typing is completed, the unit will resume the search for the next "hit."

To enable this latter type of operation, the unit is arranged so that each time a "dot" code is sensed, signifying a title block, it and its associated file identification data, will be entered into a special storage register in output core memory 70 and held there until it has been determined whether that particular record is a "-hit." If so, the file data will be transferred to the typewriter 50; if not, the next record will be entered into the core memory 70, thus erasing the previous record.

Figure 3:
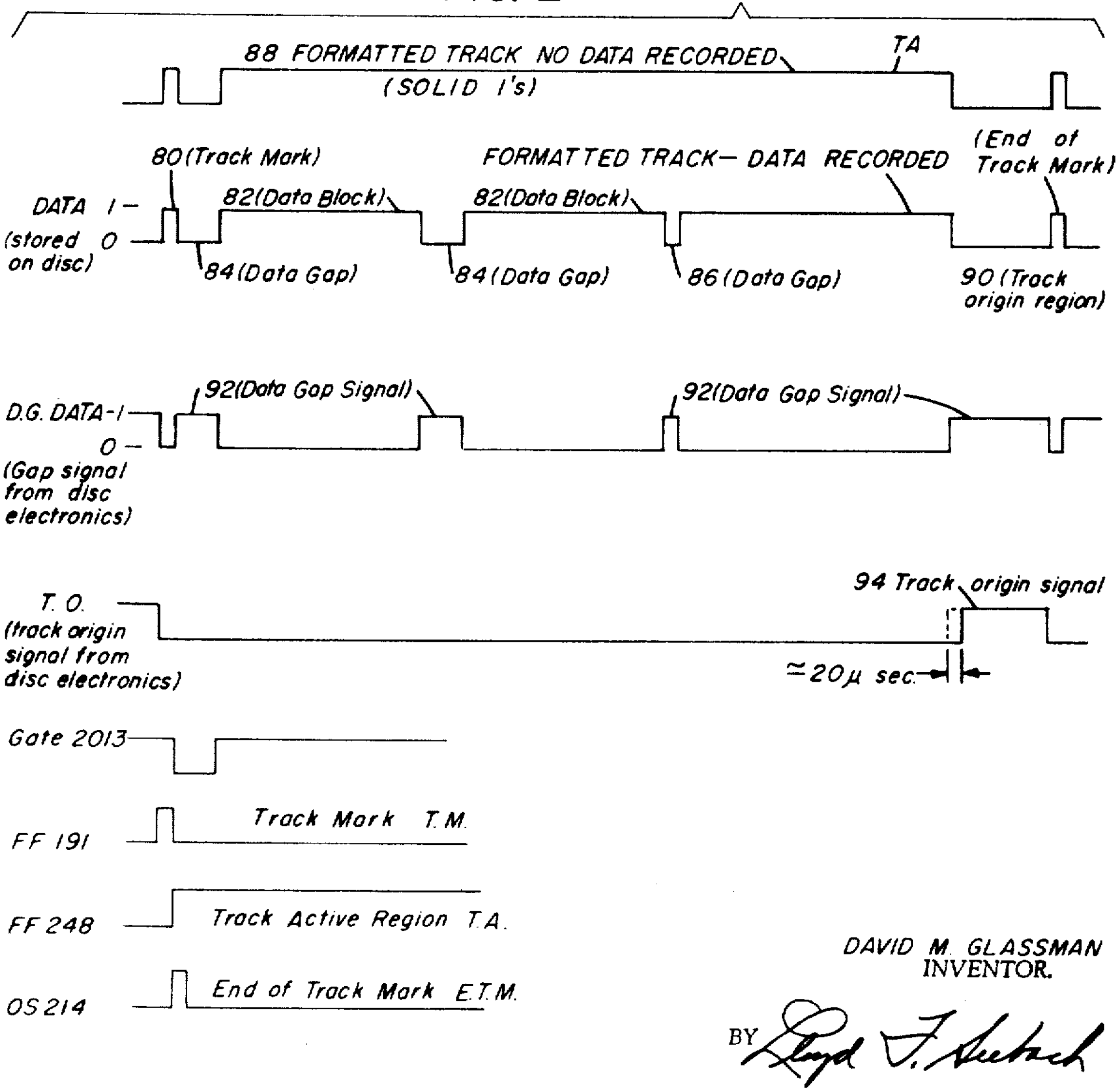
FIG. 3 is a schematic diagram of a typical data track which is not completely filled with data and showing a pattern of signals representative of a data gap and track origin.

FIG. 3 shows a schematic diagram of the typical data track on disc 73 which is not completely filled with data, and the corresponding data gap and track origin signals from the disc memory system 71. Track mark 80 comprises a 1 – 2 microsecond data block of 1's to signify the start of the track. Data blocks 82 comprise data in multiples of 35 bits. Between track mark 80 and the first data block 82, there is a data gap 84 comprising an erased track area of approximately 15 microseconds. Also, between adjacent data blocks 82, a data gap 84 is arranged having an erased track area of approximately 15 microseconds. After the last data block 82, a data gap 86 is provided which comprises an erased track area of approximately 2 microseconds. Following data gap 86 is a formatted track 88 which is a single recorded area of all 1's. Arranged between formatted track 88 and track mark 80 is track origin region 90 which is an erased track area of a time greater than 15 microseconds.

Disc memory system 71 supplies data gap signals 92 indicative of erased regions 84, 86 and 90 on the data track, as well as track origin signal 94 which is indicative of track origin region 90 on the data track.

Figure 4A:
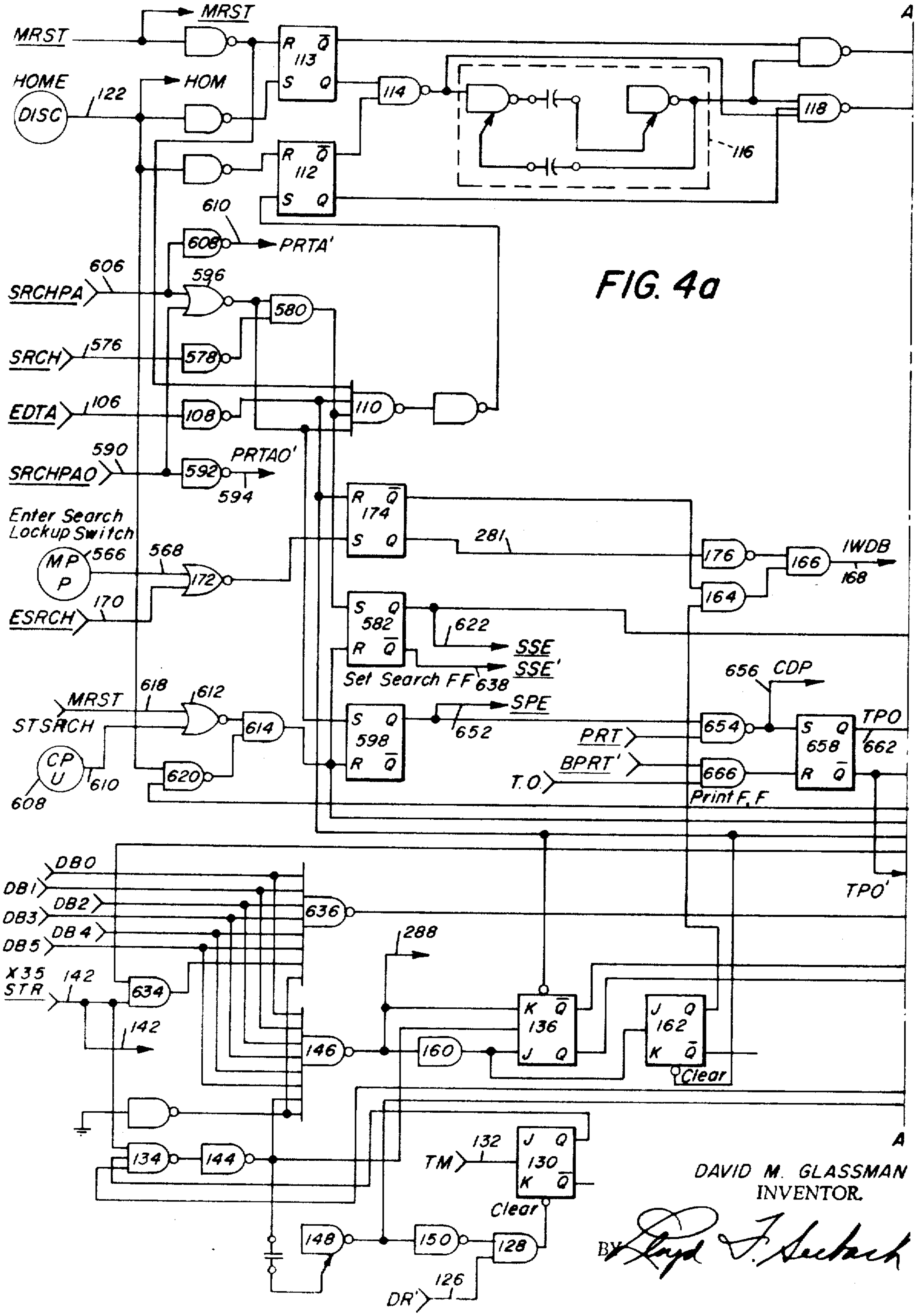
FIGS. 4*a* and 4*b* (together) are schematic circuit diagrams of the logic for track location when data is to be recorded on a track of the disc memory.
Figure 4B:
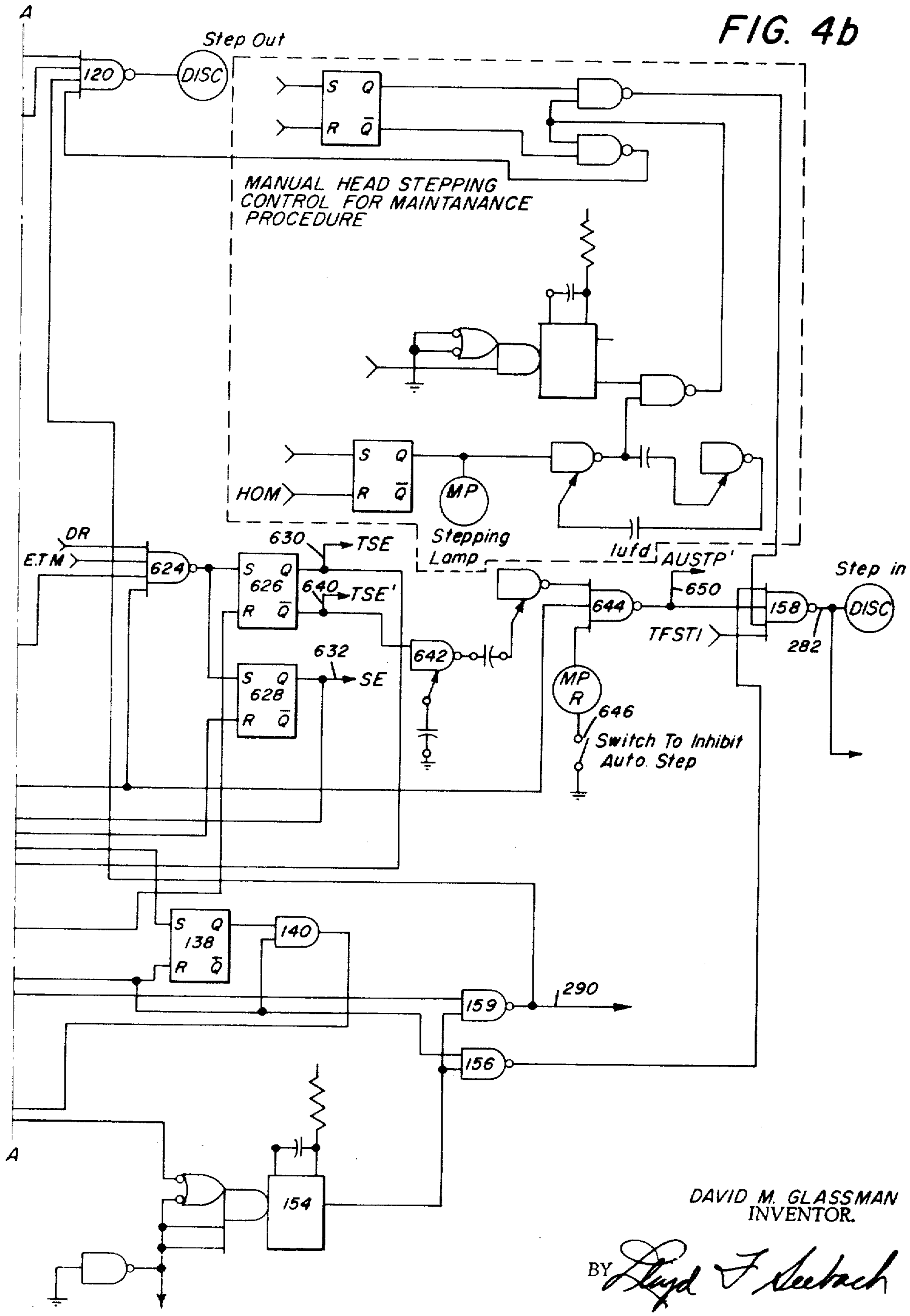

In order to understand how the recording of data on a track in disc 73 occurs, reference is made to FIG. 4a. The operator actuates an "enter data mode" switch (not shown), which causes a pulse to be sent over EDTA line 106 through inverter 108 to gate 110. Inverters are used in many places throughout the system and, as is well known by those skilled in the art, are used to provide signals of the proper polarity for subsequent actions. The output of gate 110 is used to set flip flop 112, the $\bar{Q}$ output of which produces an input to gate 114. The output of gate 114 enables free running multivibrator 116 whose output is fed to gate 118. A second input to gate 118 comes from the Q output of flip flop 112 and a third input to gate 118 comes from the output of 114. Gate 118 is therefore enabled, and pulses are produced at the output of gate 118, which are fed to gate 120 (FIG. 4*b*). In the presence of appropriate pulses at any input of gate 120, head stepping pulses from gate 120 cause the head 72 to step outward. The pulses fed to gate 120 are used to step the head 72 to the outermost track on disc 73. When the head 72 reaches the outermost track, the circuitry associated with disc 73 energizes HOME line 122, thereby resetting flip flop 112 and disabling all head stepping pulses as described hereinabove. While the outward stepping of the head 72 is occurring, there is no DISC READY signal from the disc electronics on DR line 126, and therefore gate 128 cannot be enabled. With no output from gate 128, flip flop 130 is held in its reset state. When the stepping outward of the head 72 has been completed, i.e., with the head 72 located at the outermost track, the disc electronics sends a signal over DR line 126, removing the reset signal from flip flop 130. When the next TRACK ORIGIN signal from the disc electronics is fed over TM line 132 to flip flop 130 and sets flip flop 130, the output signal being fed as an input to gate 134.

A second input for enabling gate 134 is generated in the following manner. The pulse traveling over EDTA line 106 is fed through inverter 108 to flip flop 136, and also sets flip flop 138. The output from $\bar{Q}$ of flip flop 136 and the output from Q of flip flop 138 serves as inputs to gate 140. The output of gate 140 is used as the second input to gate 134. Timing pulses occurring over X35STR line 142 are fed as the third input to gate 134. The output from gate 134, when enabled as described hereinabove is inverted by 144 and fed to gate 146, to flip flop 136 and also to the one shot 148 to act as a data strobe. The output of one shot 148 is a pulse that occurs at the trailing edge of its input pulse and passes through inverter 150. When DR line 126 is active and a pulse occurs at the output one shot 148, gate 128 causes flip flop 130 to be reset. This allows only one such strobe pulse per disc revolution to occur, and this only at the beginning of a data track.

Two distinct conditions can occur at the output of gate 146, depending on whether there is true data on the track or if the track is simply formatted. A formatted track contains a track origin region 90 (see FIG. 3), a track mark 80, and a formatted track 88 consisting of all ones. If the recording head 72 is on a track on which no data is recorded, i.e., on a formatted track, the head must be stepped out (toward edge of disc) one track so that it is on the last track that contains data. If the recording head 72 is located on a track that contains data, it is stepped in (toward center of disc) until a track is found that is formatted, and the head subsequently stepped back out one track so as to position it on the track having the last true data recorded thereupon.

If it is assumed that the recording head 72 is positioned on a track upon which true data is recorded, and the data bits entering over lines 152 present any combination other than all 1's there will be an output from gate 146.

The output from gate 146 is fed directly to flip flop 136, which remains reset, the output from $\bar{Q}$ being fed to gate 156. At the trailing edge (conclusion) of a timing pulse reaching one shot 148, as described hereinabove, a pulse is produced that is fed to the input of one shot 154. The output from one shot 154 is fed to gates 156 and 159. If gate 156 is enabled, the output from one shot 154 is used to provide a pulse at gate 158 to cause the head to step in one track. In the presence of a pulse at any of the inputs to gate 158, it will be enabled thereby generating a head stepping pulse that causes the disc head 72 to step in one track. The aforementioned procedure is repeated until a pulse is present on all bit lines 152 (all 1's), which signifies that the recording head 72 is on a formatted track, since no character exists whose binary representation is all 1's. The output pulse from gate 146 allows flip flop 136 to be set when clocked by the output signal from gate 134. The output pulse from the $\bar{Q}$ output of flip flop 136 resets flip flop 138, which inhibits gate 140 and hence no timing pulses will be fed through gate 134 to flip flop 136. At the trailing edge of the last timing pulse fed to one shot 148 through inverter 144 and gate 134, one shot 148 produces a pulse that is fed to the input of one shot 154. The output of one shot 154 is one of the input pulses that is provided to enable gate 159 together with the Q output from flip flop 136. When gate 159 is enabled, its output pulse is fed to gate 120 which provides a pulse that is fed to the disc electronics thereby causing the disc head 72 to step out one track, thus placing the head on the last track containing true data.

When a pulse is present on each of lines 152 (all 1's), the output pulse from gate 146 is fed through inverter 160 and as a clock input to flip flop 162 which sets the latter. The Q output from flip flop 162 is fed to gate 164 and signifies that the head 72 has been properly positioned. When the unit is in the enter data mode, as determined by flip flop 174, gate 164 is enabled and its output is then transmitted to line 168 ("Inhibit Write Data Block") (IWDB). This level is available when an EDTA pulse resets flip flop 174. When IWDB line is energized, the disc writing logic is enabled.

Figure 5A:
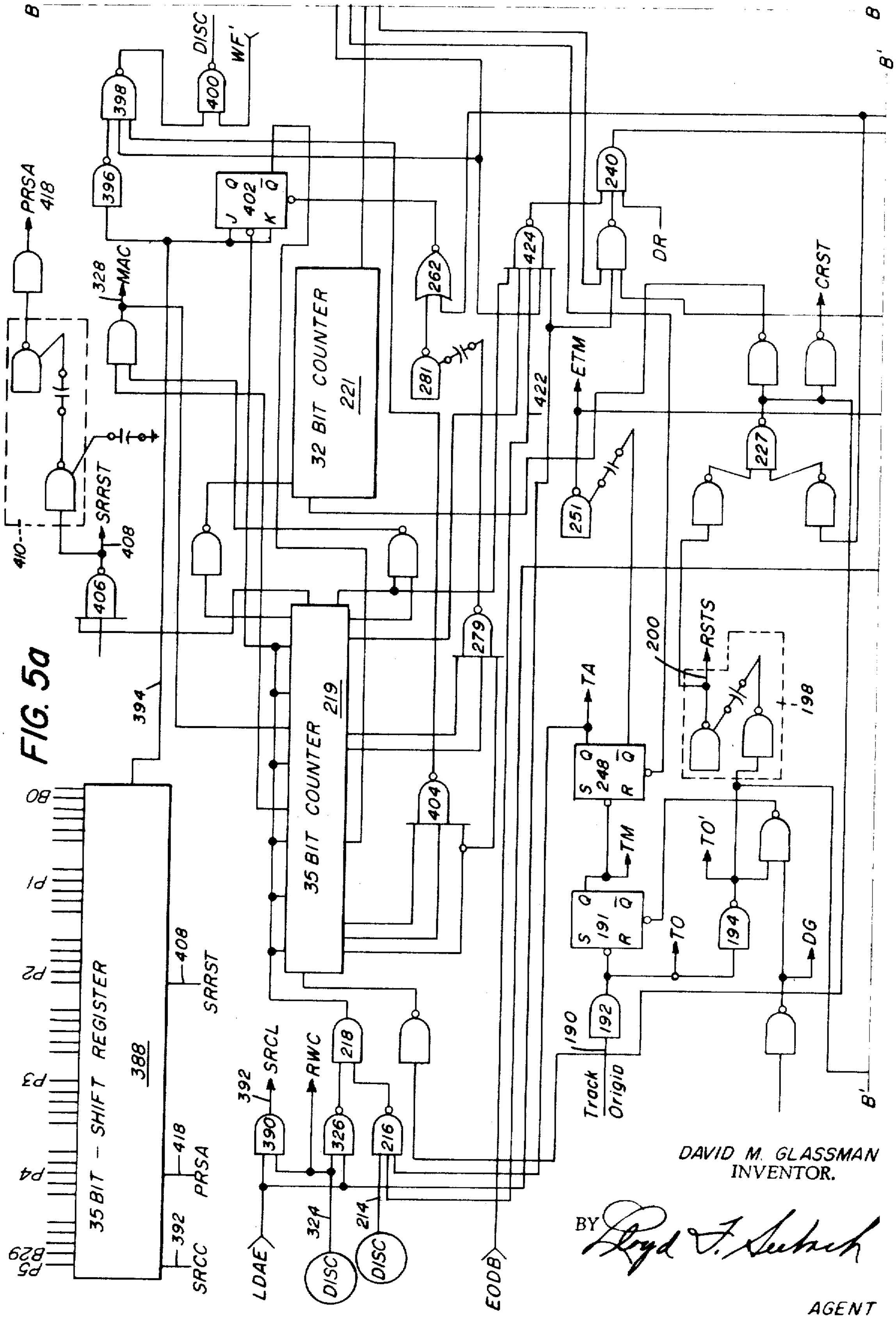
FIGS. 5*a* and 5*b* (together) are schematic circuit diagrams of the logic for recording of data on a located data track of the disc memory.

Certain timing signals are required to indicate when the track mark is passing the disc head 72, and also when it has passed the head. The region of the track that is allowed to contain data is called the track active region. With reference particularly to FIGS. 3 and 5*a*, flip flop 191 is set at the end of the track origin region and reset at the start of the next data gap as shown in FIG. 3. This produces a signal indicative of the track mark region. When flip flop 191 is reset, flip flop 248 is set and is reset by the X42 counter reset signal to be described hereinbelow. The timing during which the flip flop 248 is set is indicative of the time during which data can be recorded on the disc 73. One shot 251 produces a pulse at the start of this region which is indicative of the end of the track mark region.

Before any data can be written on the disc 73, it is necessary that the track be formatted as described hereinabove with reference to FIG. 2. The logic for the formatting operation is disclosed in conjunction with FIG. 5*b* and the description relating thereto. The operator closes format switch 261 which causes one shot 263 to produce a signal whose active time is longer than one revolution of the disc 73. This signal is applied to the circuitry associated with the disc recording operation and causes the track which is then passing the head 72 to be totally erased. At the conclusion of this signal, one shot 265 produces a pulse which is recorded on the disc 73 through gate 268 as described hereinafter. This pulse from one shot 265 also sets flip flop 267 through gate 269 which will be enabled if the DR write line 126 is active. On the next revolution of the disc 72, ETM signal will set flip flop 256 through gates 252 and 254, thereby initiating a writing sequence which will be terminated by the X42 counter reset signal. Gate 271 decodes a predetermined state of counter 223 which indicates the maximum number of bits that is desired to be recorded on the track. One shot 273 produces a pulse at this time that is used to reset counter 223 and also flip flop 248. This pulse passes through gates 275 and 240 and resets the writing logic thereby terminating the formatting operation. During the formatting operation, gate 400 is held in a state to produce all 1's on the disc 73 by the $\bar{Q}$ output from flip flop 267 (WF').

Figure 5B:
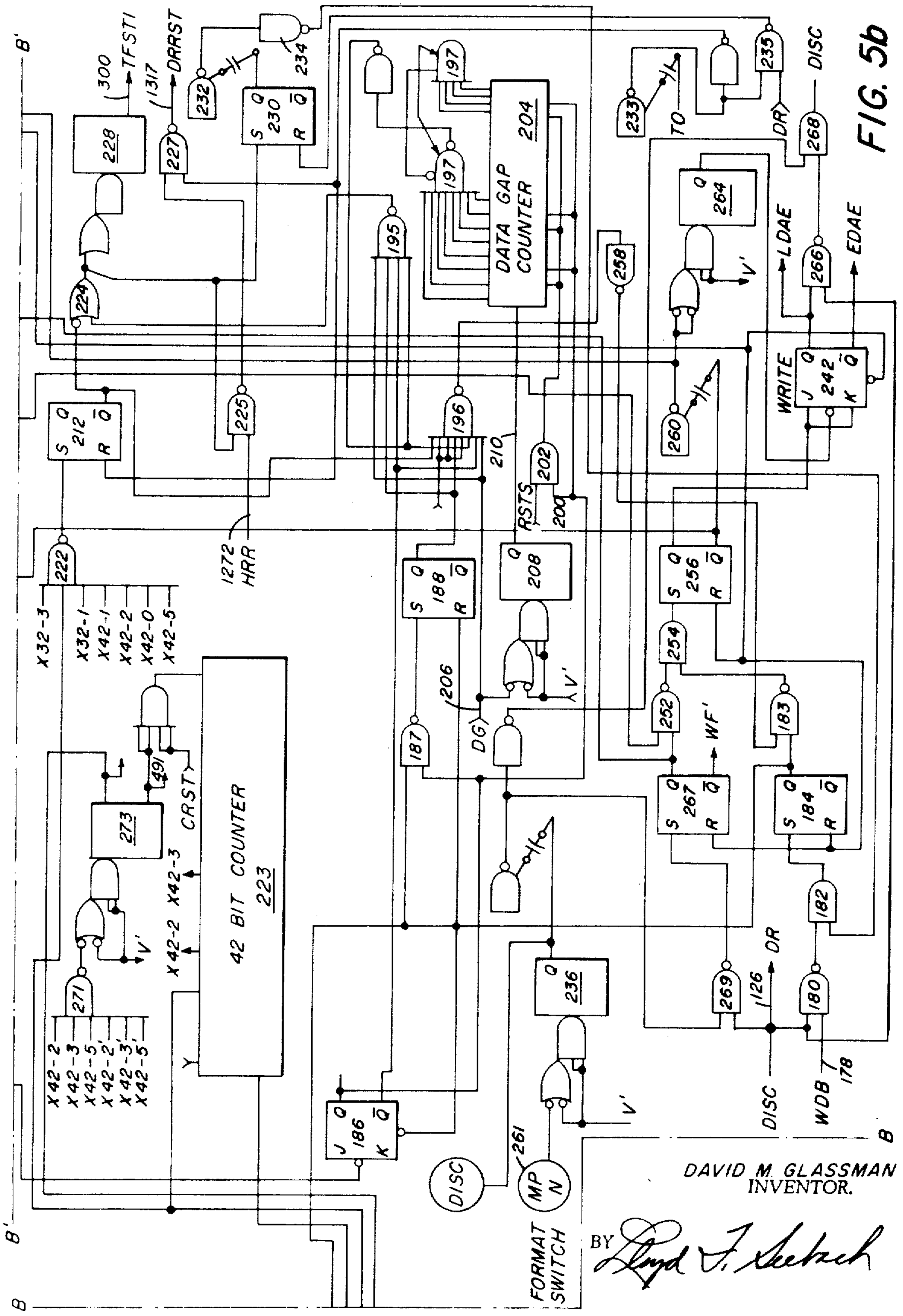

The method of writing data on the disc 73 is best understood with reference to FIGS. 5*a* and 5*b*. A pulse is generated on Write Data Block (WDB) line 178 by depressing the carriage return key on the input typewriter and its generation will be discussed in more detail with reference to FIG. 8. The pulse on line 178 (WDB) is fed to gate 180. A signal from the disc electronics signifying that the disc is ready to receive data is presented over DR line 126 and is the other input to gate 180. The output pulse from gate 180 is applied to gate 182. The other signal required to enable gate 182 will be discussed hereinbelow. When enabled, gate 182 provides the signal for setting flip flop 184. When flip flop 184 is reset, its Q output holds flip flops 186 and 188 a reset condition. When flip flop 184 is set, then flip flop 186 can be toggled by its input. At the start of the next track origin region on the data track, the disc electronics sends a pulse over Track Origin (TO) line 190 to inverter 192 whose output sets flip flop 191 and to inverter 194. The output from flip flop 186 is transmitted to gate 187 and is used to set flip flop 188. The Q output from flip flop 188 enables data gap counter gate 196. At the end of the track origin region on the data track, a signal is sent from the disc electronics that is fed through inverters 192 and 194 to the input of one shot 198 which generates a pulse that is fed over Reset Track Start (RSTS) line 200 to gate 202 (FIG. 5*b*). The Q output from flip flop 186 is fed to gate 202, which, when enabled, provides a pulse for resetting data gap counter 204 to a state of all 0's. The disc electronics sends pulses indicative of each data gap on the track over data gap (DG) line 206 as an input to one shot 208, which, in turn, provides pulses indicative of the end of each data gap region over line 210 to data gap counter 204, thereby clocking data gap counter 204. The data gap counter 204 is set in an "up" mode by the Q output from flip flop 186 as described hereinabove. At the beginning of the next track origin region on the disc track, the disc electronics sends a signal indicative of the presence of the track origin region over line 190 through inverters 192 and 194 to flip flop 186, thereby changing its state reversing data gap counter 204 to the "down" mode. Data gap counter 204 continues to count the pulses indicative of the end of data gap regions on the track, as described hereinabove.

When data gap counter 204 reaches a state of all 0's, there are two possible conditions that might exist: 1) the track has enough room remaining on it to allow the contents of the scratch pad memory to be written on the track, or 2) the track does not have enough room remaining on it to allow the contents of the scratch pad memory to be written on the track. The maximum capacity of the scratch pad memory is 32 words, each word having 35 bits (including parity bits).

If it is assumed that there is not sufficient space left on the track to allow writing, the following sequence of events will take place. Continuous clock pulses from the disc electronics are fed over line 214 to gate 216. In the presence of such clock pulses with appropriate signals from the $\overline{Q}$ output of flip flop 256 and from the Q output from flip flop 248, gate 216 produces pulses that are fed to gate 218. The output pulses from gate 218 are fed into the 35 bit counter 219. Each output from counter 219 clocks the 32 bit counter 221 which, in turn, clocks the 42 bit counter 223. Gate 222 decodes the condition that the count of the counter 223 is 35 X 32 bits from the end of the track. The output pulse from gate 222 is used to set flip flop 212 whose $\overline{Q}$ output is applied to gate 224. Data gap counter gate 197 will feed a pulse to gate 224 via gate 195 when the next data gap passes the head, provided flip flop 212 has been set. The output pulse from gate 224 is fed to one shot 228, whose output is applied to TFSTI line 300 which is connected to gate 158 (FIG. **4*b*). The output pulse from gate 158 causes the disc head 72 to step in one track. The output pulse from gate 224 is also used to set flip flop 230 which is reset by the condition that disc 73 is ready and the end of track origin region has occurred, as determined by gate 235 and one shot 233. One shot 232 will then produce a pulse that is fed through inverter 234 to gate 182**, thereby re-initiating the start of the writing cycle.

If it is assumed that there is sufficient room on the disc track to record data, flip flop 212 is not set by the output of gate 222 and, hence, gate 224 is not enabled. When the data gap mentioned hereinabove passes the disc head, data gap counter gate 196 produces a pulse that is fed to inverter 258 and via gates 183 and 254 will set flip flop 256, providing flip flop 184 is set as determined by gate 183. Gate 254 allows the outputs of either gate 183 or 252 to set flip flop 256. The output from the Q output of flip flop 256 is used to enable Write flip flop 242, and the $\overline{Q}$ output triggers one shot 260. The output pulse from one shot 260 is fed to gate 262 for resetting parity flip flop 402. This pulse is also used to reset counter 219, 221 and 223. Gate 277 combines this start of writing reset with the RSTS reset that occurs at the start of each track as described hereinabove. The output pulse from one shot 260 is also fed to one shot 264 which will be triggered at the trailing edge of said pulse to produce a clock pulse for setting Write flip flop 242. The Q output from Write flip flop 242 is fed to gate 266 and if there is a disc ready signal, gate 266 will be enabled for feeding a pulse to gate 268. The output pulse from gate 268 is one whose length is determined by the length of the data block being written and indicates to the disc electronics that writing on the disc can proceed.

The disc writing circuits are reset in the following manner. When an "End of Descriptor Bit" (EODB) is read from the scratch pad memory signifying that this is the last word to be written onto the disc for that particular block, a signal is applied via line 422 to gate 424 which is then enabled. The other inputs to gate 424 decode the state of the 35 bit counter 219 to signify that all 35 bits have been shifted to the disc electronics. When all 35 bits have been shifted to the disc electronics, gate 424 will produce an output which through gate 240 will reset flip flops 242, 256 and 184, thus stopping the writing command to the disc electronics.

Figure 6:
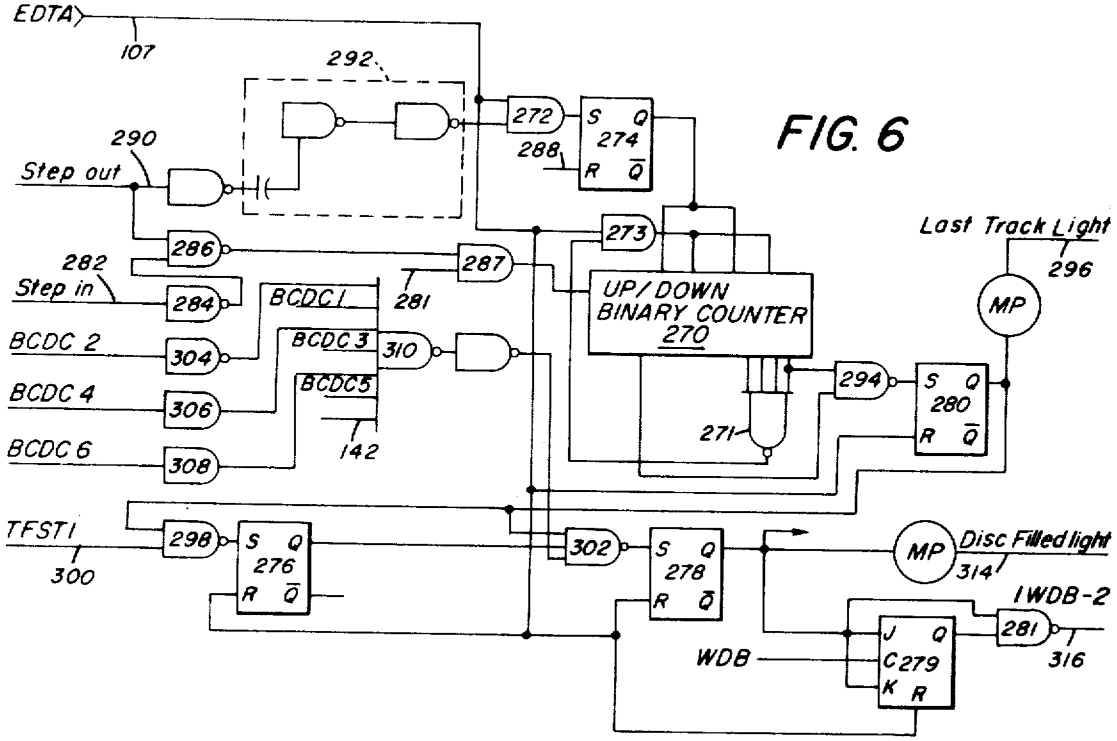
FIG. 6 is a schematic circuit diagram of the logic for determining the recording availability of data tracks on the disc memory.

When it is desired to write data on the disc, it must also be determined if there is sufficient room on the disc. This is accomplished by the circuitry shown in FIG. 6. The pulse traveling over EDTA line 107 resets up/down binary counter 270. The pulse traveling over EDTA line 107 is fed to gate 272 whose output pulse sets flip flip 274. The output from flip flop 274 places counter 270 in the "up" mode of operation. The pulse traveling over EDTA line 107 also resets flip flop 276, 278, 279 and 280.

Pulses from gate 158 (see FIG. 4*b*) signifying that the disc head should be stepped in are also fed over line 282 to inverter 284. The output pulses from inverter 284 are fed to gate 286 which will feed a clocking pulse to counter 270 if the logic is in the "enter data" mode with a signal on line 281, thereby enabling gate 287. When gate 146 (see FIG. 4*a*) indicates that it has found a formatted track, it will send a pulse over line 288 to flip flop 274, thereby changing its state and causing counter 270 to be set in the "down" mode. Pulses from gate 159 (see FIG. 4*a*) signifying that the disc head 72 should be stepped out are fed over line 290 to gate 286 which feeds a clocking pulse to counter 270. Counter 270, which is in the "down" mode, subtracts one count from its value when the "step out" pulse appears on line 290. At the end of said "step out" pulse appearing on line 290, one shot 292 feeds a pulse to gate 272 which sets flip flop 274. Flip flop 274 being set, changes counter 270 back to the "up" mode of operation. As tracks become filled, and pulses from gate 158 signifying that the disc head should be stepped in are fed over line 282 to gate 286, gate 286 feeds clocking pulses to counter 270, which is in the "up" mode of operation. When the counter 270 reaches the state $2(0_8$ $(128_{10})$, i.e., the disc recording head 72 is on track 129 (there are 130 tracks in all) counter 270 feeds pulses to both inputs of gate 294 which then supplies a pulse to set flip flop 280. The output Q of flip flop 280 is fed to "last track" light 296, signifying that recording is taking place on the next to last track. The same signal is also fed to gate 298. A pulse from one shot 228 (FIG. 5b) signifying that the next-to-last track is filled is fed over line 300 to gate 298 to set flip flop 276. The output Q from flip flop 276 is fed to gate 302. The start of a new document, is indicated by a dot code having the binary representation 010101 which is presented by data entry input lines BCDC1-6 (FIG. 6) to gate 310 directly and through inverters 304, 306, and 308. The pulse from the input strobe line 142 is also fed to gate 310. The output pulse from gate 310 is fed through inverter 312 to gate 302 which sets flip flop 278. The output Q from flip flop 278 is fed to "disc filled" light line 314, which is a visual signal that the disc is filled. The output Q of flip flop 278 is also used to enable flip flop 279. At the conclusion of the next pulse on the WDB line flip flop 279 will be set. When both flip flops 278 and 279 are set, gate 281 will be enabled to produce a signal on the inhibit write data block 2 (IWDB-2) signal line 316. This will inhibit all further writing on the disc as described hereinbelow. The one block delay of flip flop 279 is necessary to insure that the last block on this disc starts with a dot code.

When only the first track of the disc has data recorded on it, an underflow condition of counter 270 will occur. Gate 271 detects this condition and uses gate 273 to reset all affected circuits.

Figure 7:
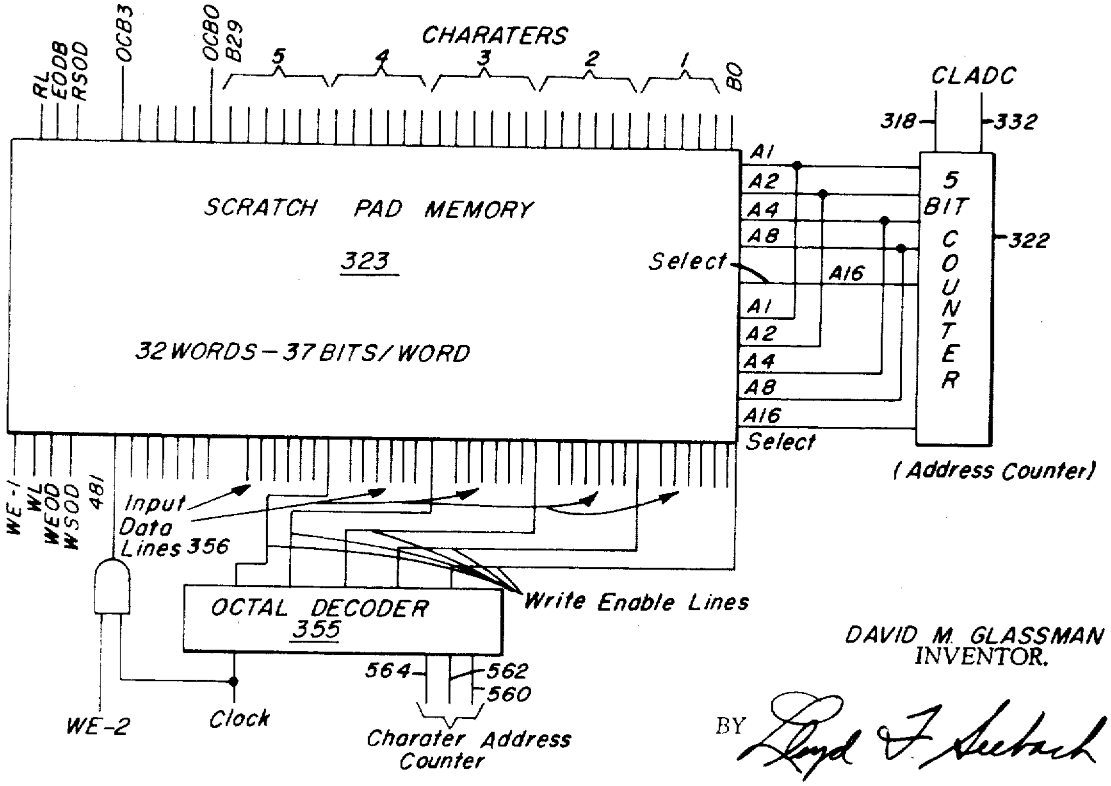
FIG. 7 is a schematic circuit diagram of the logic organization of the scratch-pad memory.

In order to understand how data is loaded onto the disc, reference is now made to FIGS. 5, 7, 8*a* and 8*b*. A clear address counter (CLADC) pulse is fed over line 318 to memory 322 (FIG. 7). The "clear address counter" pulse is initiated by either a carriage return signal or an end of card signal, the generation of both of which will be discussed in detail hereinafter with reference to FIG. 8. These pulses are used to clear scratch pad memory word address counter 322 and place it in a state of all zeros.

Read/write pulses from the disc electronics are fed over line 324 (see FIG. 5*a*) to gate 326. These clock pulses do not exist during track origin or data gap regions and are used in this section of the logic only for clocking data from shift register 388 and the clocking of the counters that control said shifting. During the operations of locating the area on the track where data will be written, the counters are clocked by a continuous clock signal from the disc line 214. Gate 326 selects the read/write clock during writing operations and gate 216 selects continuous clock at other times. These clocks are used to increment 35 bit counter 219 in a synchronous manner.

Once every 35 pulses from gate 218, counter 219 provides a pulse over memory address clock (MAC) line 328. The pulse traveling over MAC line 328 is fed to gate 330 (see FIG. 8*b*). Gate 330 outputs a pulse over AIADC' line 332 which is fed to counter 322 (see FIG. 7). Scratch pad memory word address counter 322 provides output pulses to the various elements of the scratch pad memory. Data bits from the typewriter are read into the various elements of the scratch pad memory over lines 356. A more detailed description of the operation of the scratch pad memory will be given hereinafter.

All input data from the typewriter and card reader is stored temporarily in the scratch pad memory before being shifted out to the disc. Also, all search descriptors and their "op" codes and control bits needed for searches are stored in the scratch pad memory. To further understand the organization and operation of the scratch pad memory, reference is made to FIGS. 2 and 7.

The scratch pad memory is organized as a 32 word memory with 37 bits per word, as shown in FIG. 2. For this implementation, high speed bipolar integrated circuits have been used. These circuits are organized as 16 words by "*n*" bit memories, where *n* can be 1, 2, 3, 4, 5 or 6. Other memory devices could be used. Each word comprises five characters, each of which is defined by 6 bits (30 bits), an "OP" code defined by 4 bits, a start of descriptor, an end of descriptor, and a work link, each of which is defined by a single bit (3 bits).

FIG. 7 shows how the scratch pad memory is organized, Since each section of the scratch pad memory has only 16 words and 32 words are required, the outputs of each section are wired together and provided with inverters so that both true and inverted outputs are available. Each memory element has internal decoding to select the requested word and has a select line which is addressed by the high order bit of the address counter. This provides for complete selection of 32 words with no need for any further decoding.

The 30 data bits are organized as five 6-bit characters. The six input data lines are connected in parallel to the data inputs of each of the five character sections of the memory. The character address counter, described with reference to FIG. 7 in conjunction with the octal decoder 355, selects which of the five character positions the data will be written into. At the appropriate time, a pulse on clock 1 line enables the octal decoded 355 and the input data is written into the memory. The lower four order bits of the input data are also applied to the section of the memory storing the "op" codes. These bits are stored in this section when the upper case typewriter key is actuated. During search operations, the three control bits will be written into their locations as described with reference to FIGS. 8*a*, 12*a*, and 12*b*.

The output data bits from the scratch pad memory 323 are loaded in parallel through the upper leads to the shift loading register 388 (FIG. 5*a*).

The register 388 has a capacity of 35 bits, 30 data bits being fed into the register from the scratch pad memory. Every seventh bit in the shift loading register 388 is set to zero for later insertion of parity bits. The read/write clock pulses traveling over line 324 are fed to gate 390. When a writing operation has been initiated and a LDAE signal appears at gate 390, disc write clocks are fed over shift register clock (SRCL) line 392 to shift loading register 388, causing data to be clocked out of said register in serial form over line 394 and through inverter 396 to gate 398. Gate 398 is enabled by flip flop 184 (see FIG. 5*b*), indicating that data is about to be written on the disc. The remaining input to gate 398 provides for insertion of the parity bits into the serial data stream from gate 404. Gate 398 outputs a serial string of data that includes parity bits to gate 400. Input WF' of gate 400 provides for the writing of solid "1's" during a disc formatting operation. Gate 400 provides an output to the disc electronics. The pulses from shift register 388 on line 394 are also fed to parity flip flop 402 which is clocked with every read/write clock pulse. If there are an even number of 1's in the data stream, then for even parity, no parity bit need be inserted. Flip flop 402 will be in a reset state after each six clock pulses, if the number of 1's is even and in a set state if the number of 1's are odd The parity flip flop 402 must be reset at the conclusion of every 7th clock pulse. Gate 279 in conjunction with one shot 281 produces the needed reset. The parity flip flop 402 will also be reset at the start of the writing operation when one shot 260 is triggered as described hereinabove. Gate 404 determines if a parity bit is to be inserted. Three inputs to gate 404 decode the seventh state of the counter 219 and other input senses the state of the parity flip flop 402. If it is determined by gate 404 that no parity bit need be written, then the output of gate 404 inhibits gate 398 causing a "0" to be inserted in the data stream. If a parity bit is to be inserted, then gate 404 will have no output and gate 398 will allow the parity bit to stay in the data stream. At the completion of the unloading of the 35 bits from shift register 388, gate 406 decodes this state and provides an output signal over serial register reset line (SRRST) 408. The pulse traveling over SRRST line 408 is fed to shift register 388 for clearing it to a state of all zeros. The output pulse from gate 406 is also fed to the input of one shot 410 to provide a pulse over PRSA line 418 that is fed to shift register 388, enabling said register to receive data from the scratch pad memory. As mentioned hereinabove, a pulse travels over AIADC' line 332 (see FIG. 7) each 35 clock pulses, and increments scratch pad memory word address counter 322. Counter 322 then addresses the next location in the scratch pad memory, and this data is then loaded in shift register 388 onto the disc in the manner described above.

When a pulse signifying an End of Descriptor bit is fed over line 422 to reset gate 424 (FIG. 5*a*), at the end of the next 35 clock pulses, the output from reset gate 424 goes low, hence resetting all writing circuitry.

Figure 8B:
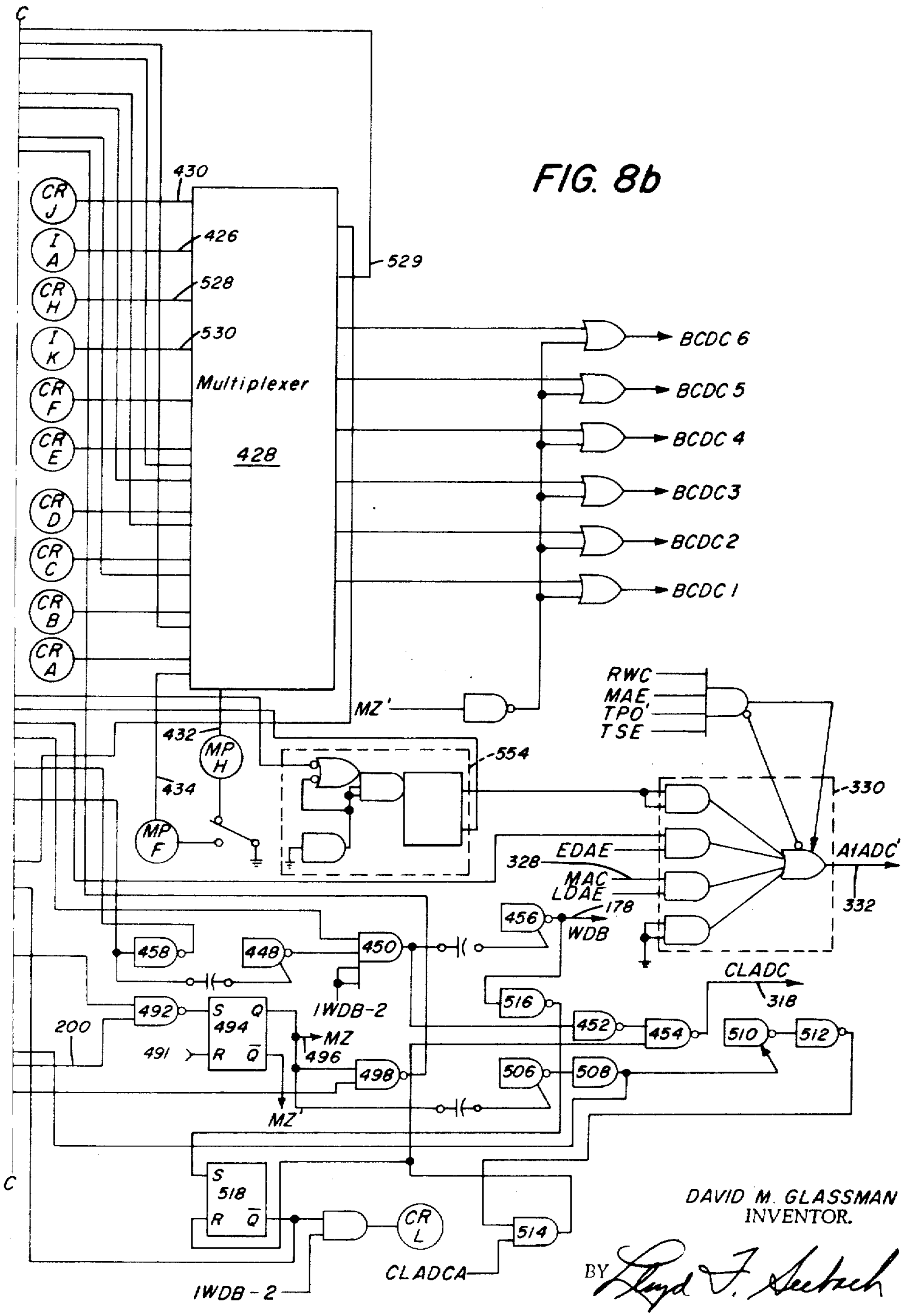
FIGS. 8*a* and 8*b* (together) are schematic circuit diagrams of the logic for the typewriter carriage return operation.
Figure 8A:
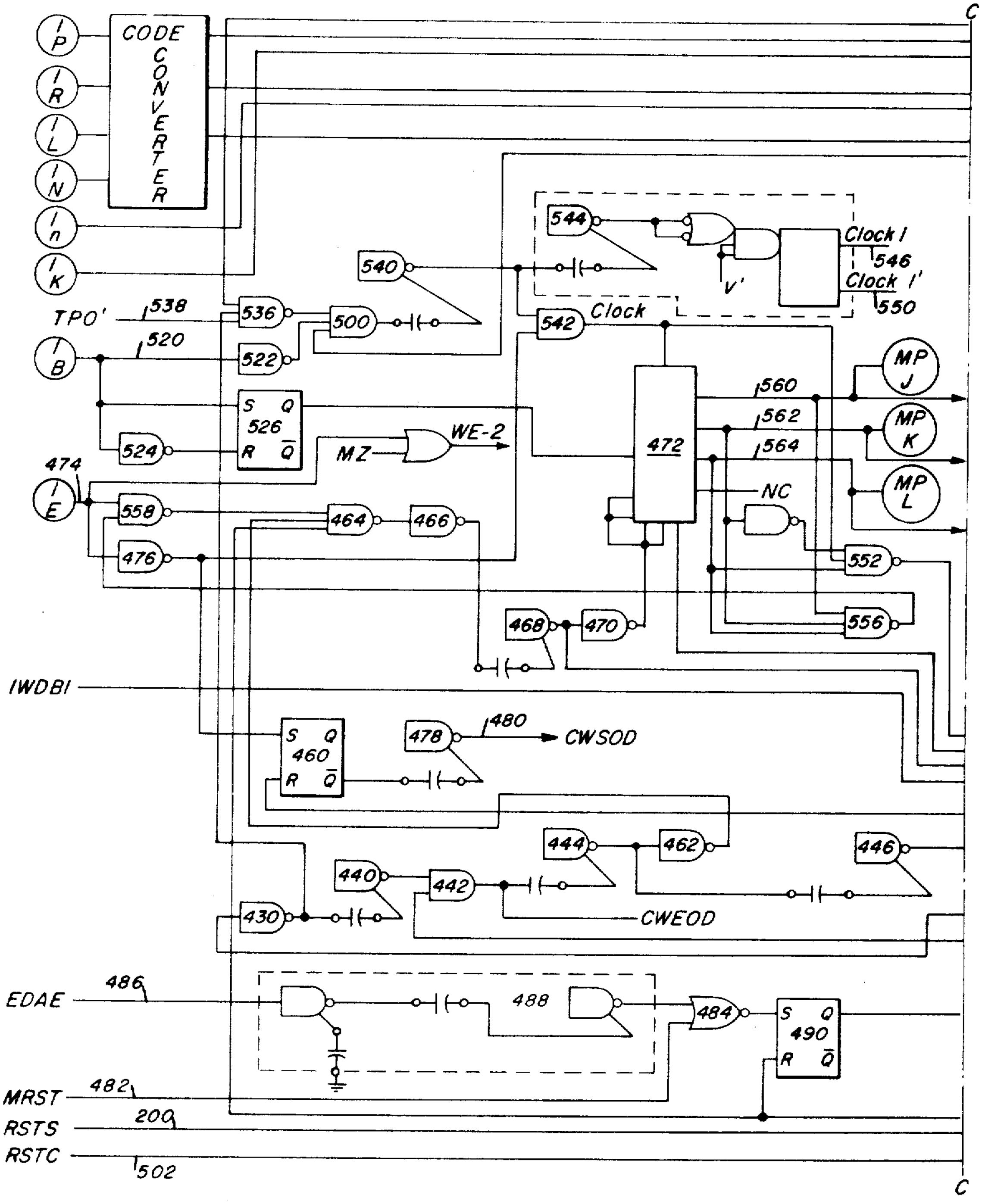

In order to understand the operation of the type writer carriage return timing operation, reference is made to FIGS. 8*a* and 8*b*. A pulse is fed to multiplexer 428 over CR line 426 when the carriage return key is depressed, over EOC line 430 when an End of Card signal is sensed from a card reader when used (not shown). Line 432 signifies that the typewriter is to be used as the input device and line 434 signifies that the card reader is to be used as the input device. Multiplexer 428 provides a pulse that is fed through inverter 430 to one shot 440 (FIG. 8*a*), and then to gate 442. If the logic is not in a disc writing operation, flip flop 518 (FIG. 8*b*) will be in a reset state and gate 442 will be enabled. Gate 442 provides a pulse that is fed to one shot 444 and the output pulse from gate 442 is also fed over the "Command Write End of Descriptor" (C-WEOD) line, which will cause an end of descriptor bit to be written in the scratch pad memory. This will be discussed hereinafter in reference to FIG. 12*a*. One shot 444 produces a pulse that is fed to one shot 446 which produces an output pulse that is fed to one shot 448. One shot 448 produces a pulse that is fed to gate 450. In the presence of IWDB1 (described earlier) and IWDB2 (to be described) at the inputs of gate 450, gate 450 produces a pulse that is fed through inverter 452 to gate 454 which provides a pulse over clear address counter (CLADC) line 318. The output pulse from gate 450 is also fed to one shot 456 which provides a pulse over Write Data Block (WDB) line 178 to initiate the disc writing sequence.

The output pulse from one shot 456 is also fed through inverter 516 for setting flip flop 518. The output pulse from one shot 446 (FIG. 8*a*) is also fed through inverter 458 to reset flip flop 460. The output pulse from one shot 444 is fed through inverter 462 to gate 464 which produces a pulse that is fed through inverter 466 to one shot 468. The output pulse from one shot 468 is fed to gate 330 which will output a pulse over AIADC' line 332 which increments scratch pad memory word address counter 322 (see FIG. 7), if the logic is in the enter data mode. The output pulse from one shot 468 is also fed through inverter 470 to character address counter 472, thereby setting character address counter 472 to a state of all ones. Character address counter 472 will be discussed in more detail hereinbelow.

It is necessary that a Start of Descriptor (SOD) bit be written in the scratch pad memory 323 when the first word of a descriptor is typed. The upper case or shift key on the typewriter keyboard is depressed, sending a pulse over line 474, through inverter 476 to set flip flop 460, the output of which is fed to one shot 478. One shot 478 produces a pulse over Command Write Start of Descriptor (CWSOD) line 480 to the scratch pad memory, which commands it, to write by way of the logic described hereinbelow with respect to FIG. 12*a* (WSOD) line 481), a Start of Descriptor (SOD) bit in that word location. Besides presenting the scratch pad memory 323 with the data bit to be written, in this case the SOD bit and also the EOD bit, it is necessary to produce a write enable pulse that will command the scratch pad memory to write the bits into storage. Gate 283 determines if a SOD or EOD bit is to be written and in conjunction with gate 285, which senses the output on one shot 1296, triggers one shot 1242 so long as the logic is not in a type out operation. The output of one shot 1242 is used to clock data into registers 1202 and 1250, as described hereinbelow. At the conclusion of this pulse, one shot 1244 produces a write enable pulse which is fed to the scratch pad memory via the WE1 line to command the writing of data into that section of the memory. Flip flop 460 must be reset by a pulse from inverter 458 before another Start of Descriptor (SOD) can be written. The pulse from inverter 458 will result from the depressing of the carriage return key, or from an end of card signal from the card reader as discussed in detail hereinabove.

The scratch pad memory 323 is a nondestructive readout device, and as such, before any new information can be written into the scratch pad memory, it is necessary to address every character location and every word in the scratch pad memory and place zeros into these locations. There is no common clear line for the entire scratch pad memory. The scratch-pad memory zeroing operation can be initiated by one of two signals, the depressing of the manual reset button which feeds a pulse over Manual Reset (MRST) line 482 to gate 484 or at the end of a disc writing operation. Enter Data Enable (EDAE) line 486 is at a low level during the time that writing is taking place on the disc. When the writing on the disc is completed, EDAE line is at a high level and feeds a signal to one shot 488 which, in turn, feeds a pulse to gate 484. In the presence of the appropriate signal at either input of gate 484, a set signal is transmitted to flip flop 490, which furnishes a signal to gate 492. On the next revolution of the disc, a Reset Track start pulse from one shot 198 (see FIG. *5a*) is fed over RSTS line 200 to gate 492 (FIG. *8b*) which produces a pulse that is fed to and sets flip flop 494. The Q output from flip flop 494 is fed over Memory zero (MZ) line 496, to gate 498 and to one shot 506. Another input to gate 498 comes over to reset clock (RSTC) line 502. The output pulse from gate 498 is used to increment character address counter 472 which in turn after every fifth character pulse, increments the scratch pad memory word address counter 322 (FIG. 7). This constant stepping action is continued for one revolution of the disc. During this time, the MZ line 496 holds all data lines to the scratch pad memory at a zero state so that zeros are written in all locations. At the end of the track active region, flip flop 494 will be reset by a pulse over line 491. One shot 506 produces a pulse, hereinafter referred to as the end of memory zero pulse, which is fed through inverter 508 to one shot 510. One shot 510 produces a pulse that is fed through inverter 512 to gate 514 whose output pulse is fed to gate 454. Gate 454 produces a pulse over CLADC line 318 which will serve to clear the scratch pad memory word address counter 322 (FIG. 7).

The output pulse from inverter 508 is used to reset flip flop 490 and is also fed to gate 464, which will subsequently cause character address counter 472 to be reset to a state of all 1's so that it will be ready for the next set of typed commands. The output pulse from gate 514 is fed to and used to reset flip flop 518.

Character address counter 472 is used to sequentially address succeeding characters in each word of the scratch pad memory, and is a three bit up/down counter. This counter is usually operated in the forward mode, but a reverse mode is available so that the operator, by means of a back space key on the typewriter keyboard, can back space a character and retype it if an error has been made. The clock signals for counter 472 are derived from three sources. If the back space key is depressed on the typewriter keyboard, a pulse is fed over back space line 520, through inverter 522 to gate 500 to provide a clock pulse. If back space line 520 is energized, the output from inverter 524 is used to reset flip flop 526. The set output Q of flip flop 526 is fed to character address counter 472, placing it in the forward mode of operation. If flip flop 526 is reset, then counter 472 is in a reverse mode of operation.

A data strobe pulse from the typewriter electronics is fed over line 530 to multiplexer 428. A data strobe pulse from the card reader electronics is fed over line 528 to multiplexer 428. Multiplexer 428 generates a data strobe pulse that is fed to gate 536. Inverter 430, whose output is also fed to gate 536, inhibits the strobe line during a typewriter carriage return. A signal level is maintained on TPO' line 538 that is indicative of the fact that the search logic is in the printout mode, thereby inhibiting the data strobe pulses. The output pulse from gate 536 is fed to gate 500 which produces an output for data strobes, typewriter back space, and memory zeroing operations. The output pulse from gate 500 is fed to one shot 540 whose output is fed to gate 542 and one shot 544. So long as there is not an upper case signal from inverter 476 at gate 542, gate 542 will feed a pulse to character address counter 472. One shot 544 outputs a pulse that is fed over clock No. 1, line 546, and an inverted output on clock No. 1', line 550 to the scratch pad memory 323 to initiate a writing cycle therewithin.

The output pulse from gate 542 is also used as a strobe signal for gate 552, which decodes the sixth state of counter 472. At the start of the sixth state, gate 552 will trigger one shot 554 which will reset the character address counter 472 and also increment the word address counter by means of a pulse to gate 330.

The outputs from character address counter 472 are fed to gate 556 to decode the all "1" state. The output from gate 556 is fed to gate 558 to inhibit any output when the counter is in the all "1" state. The output pulses from counter 472 are also fed over lines 560, 562 and 564, respectively, to the scratch pad memory (FIG. 7).

Character address counter 472 has two basic counting sequences. The normal sequence is when it counts 0, 1, 2, 3, 4, and on the following clock pulse resets itself to zero and starts counting up again. The other sequence is initiated whenever an upper case command is given over line 474 (FIG. *8a*), or a carriage return signal travels over line 426 (FIG. *8b*), or at the end of a memory zero operation. When one of these three operations has occurred, the counting sequence begins at a state of 7. Character address counter 472 has in this case been preset by means of one shot 468 to a state of all "1's", as described hereinabove and at the same time the scratch pad memory word address counter 322 (FIG. 7) is incremented by 1. The character address counter 322 is always incremented before a clock pulse so as to initiate a scratch pad memory writing cycle.

In order to understand how documents are retrieved from the file, reference is now made to FIGS. *4a* and *4b*. The operator will enter the search mode by depressing the enter search mode switch on the control console (not shown), thereby providing a pulse over EXRCH line 170 to gate 172. If enter search lock-up switch 566 is open, flip flop 174 will always remain set in the search mode. This is to prevent accidental writing on the disc. The signal traveling over line 170 is fed to gate 172 and its output signal is fed to and serves as a set pulse for flip flop 174. The signal from the Q output of flip flop 174 will then be fed through inverter 176 to gate 166 which will output an IWDB signal which will inhibit writing of data blocks on the disc while the system is in the enter search mode. Once the operator has formulated his questions on the typewriter, he is then ready to search the file for answers to his search request. Three search modes are available from the control panel. If the operator desires only a numerical display of the number of answers to his request, the operator will depress the search switch on the control console in order to operate a pulse over SRCH line 576. The pulse traveling along SRCH line 576 is fed through inverter 578 to gate 580 which will provide a pulse that is fed to gate 110. The output pulse from gate 580 is also used to set flip flop 582.

If the operator desires that a search be conducted and only the title be printed for each document that satisfies his search request, the operator will depress the search and print address switch (not shown), causing a pulse to be generated over SRCHPAO line 590. The pulse traveling over line 590 is fed through inverter 592 and its output appears on print address only (PRTAO') line 594. The pulse traveling over line 590 is also fed to gate 596 which will output a pulse that is fed to gate 580, to gate 110 and to flip flop 598 for setting it.

If the operator desires to search for all documents satisfying his search request and to have the complete document printed out, the operator will depress the "search and print all" switch (not shown), so as to produce a pulse over "search and print all" (SRCHPA) line 606. The pulse traveling over line 606 is fed to gate 596 and to inverter 608 which provides an output to print all (PRTA') line 610. The output pulse from gate 596 is fed to gate 110 and to flip flop 598 as a setting pulse.

The depressing of either of the search switch, search and print address switch, or search and print all switch (all not shown) will cause a signal from gate 110 which is fed as a set pulse to flip flop 112, whose output will cause the head of the disc memory to be stepped outward to the HOME position, as discussed hereinabove in detail. The depressing of the enter search mode switch (not shown), and any one of the switches will also cause search flip flop 582 to be set, as described hereinabove, and it will remain set until a search is terminated by one of three actions: 1) The action of the operator depressing stop search switch 608 will send a pulse over stop search (STSRCH) line 610 to gate 612 which will produce a pulse that is fed to gate 614. The output from gate 614 will be fed to search flip flop 582 as a reset pulse. 2) the action of the operator in depressing the manual reset (MRST) switch (not shown) will send a signal over manual reset (MRST) line 618 that is fed to gate 612 which provides an input to gate 614 whose output is used to reset flip flops 582, 598 and 628. 3) The last condition that will cause search flip flop 582 to be reset is the recording head of the disc reaching its inner home position. When in this inner home position, the disc electronics will send a signal over HOME line 122 that is fed to gate 620. If flip flop 628 has been set, gate 620 produces an input to gate 614, whose output is used as a reset pulse for flip flop 582, etc.

The set output Q of search flip flop 582 is fed over set search enable (SSE) line 622 and to gate 624. A signal traveling over the disc ready (DR) line 126 is fed to gate 624 to prevent any further action from happening until the disc recording head has settled from any of its stepping actions, and the disc is ready. Gate 624 will remain enabled unless the logic is in a printout mode. The logic of the printout mode will be discussed in detail hereinafter. If all enables are present at gate 624 when the End of Track Mark (ETM) pulse occurs, gate 624 will output a pulse that will be used to set track search enable flip flop 626 and search enable flip flop 628. The output Q of flip flop 628 energizes search enable (SE) line 632 and is also fed to gate 620. The output Q of flip flop 626 energizes track search enable (TSE) line 630 and is also fed to gate 634. Clock pulses are fed over X35STR line 142 to gate 634 whose output is fed to gate 636. Data bits coming over lines 152 are also fed to gate 636 and when the presence of all "1's" is detected by gate 636, signifying the end of a recorded data track, gate 636 produces a pulse that is fed as a reset pulse to track search enable flip flop 626. The resetting of flip flop 628 will occur when a pulse is received only from gate 614. The pulse from gate 614 simultaneously resets set search flip flop 582, causing SSE' line 638 to become energized. The reset output $\bar{Q}$ of track search enable flip flop 626 will energize TSE' line 640. The reset output $\bar{Q}$ of track search enable flip flop 626 is also fed to one shot 642 which will produce a pulse that is fed to gate 644 which, in turn, will be energized only if the unit is not in the printout condition as described hereinafter. The closing of inhibit auto step switch 646 disables gate 644. If there are no disables at the inputs of gate 644, an output pulse will energize auto step (AUSTP') line 650 and also be fed to gate 158. Gate 158 produces a pulse over line 282 that signals the disc electronics to step the recording head to the next track so that it can be searched.

The output Q of set print flip flop 598 energizes set print enable (SPE) line 652 and is also fed to gate 654. When a print command is sent from the printout logic, to be described hereinbelow, over PRT line 660 to gate 654, gate 654 will produce a signal that will energize count documents printed (CDP) line 656 and also serve as a set pulse for print flip flop 658. The output Q of flip flop 658 energizes type out (TPO) line 662. All further searching of the disc is inhibited until the printout operation at the typewriter is completed. At the completion of the printout operation of the typewriter, a signal is sent over BPRT' line 664 to gate 666, the printout logic being discussed hereinafter. At the conclusion of that track the T.O. signal appears at gate 666 which produces a pulse that resets flip flop 658. The reset output $\bar{Q}$ of print flip flop 658 is fed to gate 624 and to gate 644, providing a necessary enable for gate 624 so that normal searching operations can continue and a necessary enable for gate 644 so that normal head stepping operations can also continue.

Figure 9:
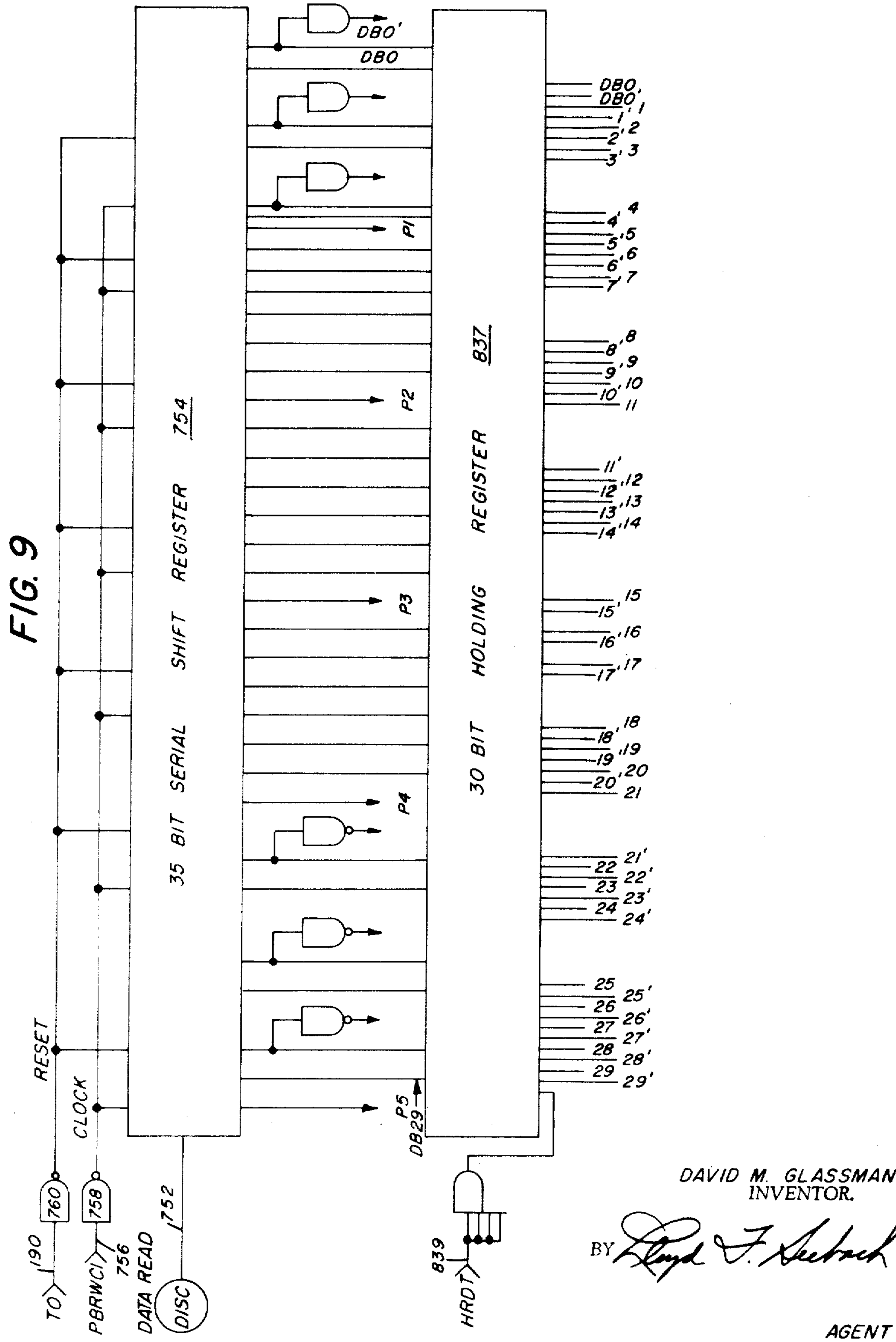
FIG. 9 is a schematic circuit diagram of the logic for read-out of data from the disc memory for comparison with the search data.

In order to understand how data is read from the disc memory to the comparison logic, reference is now made to FIG. 9. Data is continuously clocked from the disc memory in serial bit fashion at a one megahertz rate over data read line 752 to 35 bit long serial shift register 754. Pulses traveling over power buffered read/write clock 1 (PBRWC1) line 756 are fed through inverter 758 in order to clock register 754. The origin of the pulses traveling over line 756 will be discussed in detail hereinafter with reference to FIG. 12. Pulses traveling over TO line 190 are fed through inverter 760 in order to clear register 754 at the start of a new track origin region.

When the 35 bits including parity bits have been loaded into register 754, the 30 data bits are transferred in parallel fashion to holding register 837 which comprises 30 bistable latches. Certain of the outputs of the 35 bit shift registers are inverted for use in other sections of the logic. A pulse traveling over holding register data transfer (HRDT) line 839 is used to load the data into the 30 bistable latches. THis pulse occurs every 35 data clock pulses.

Figure 10A:
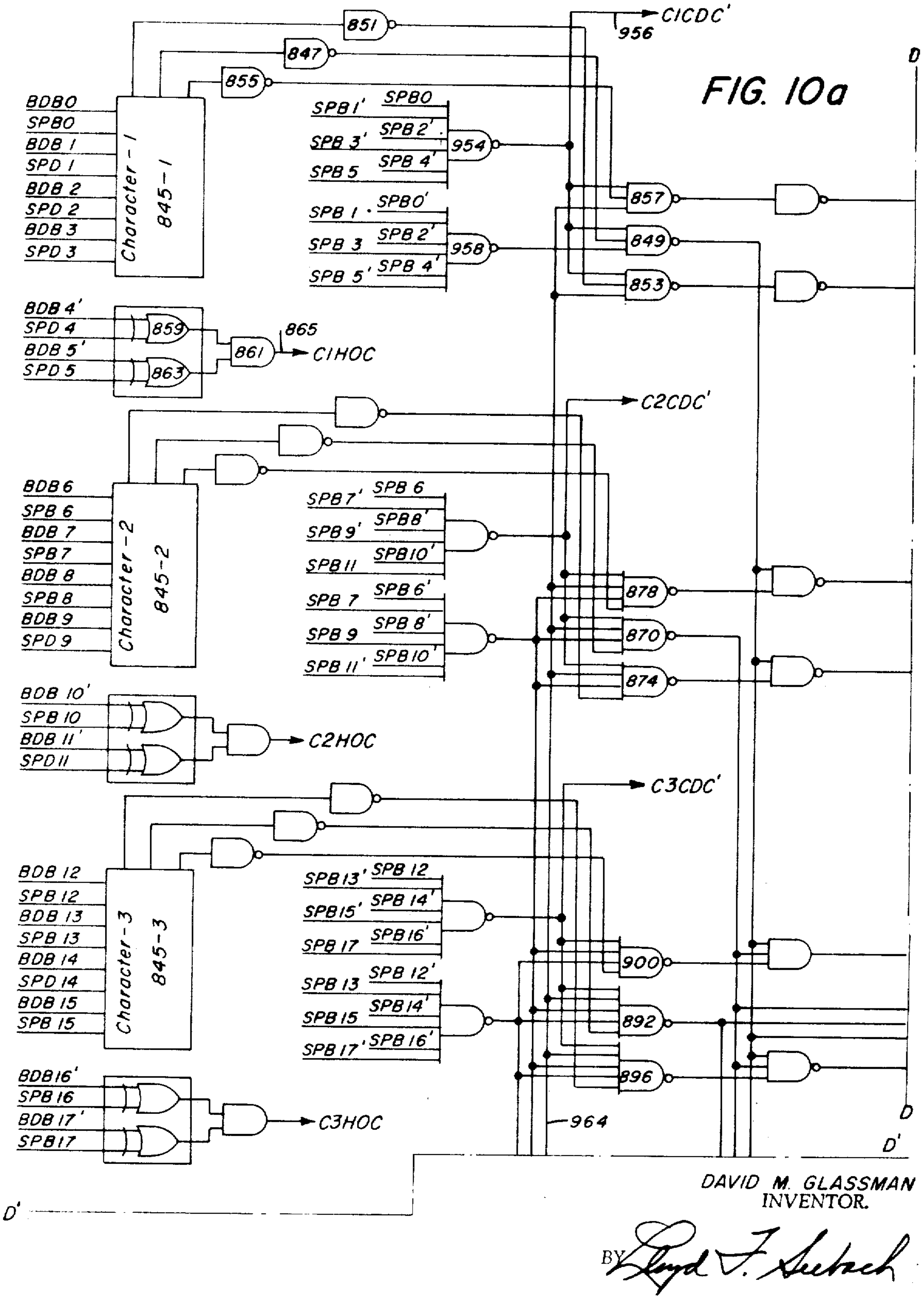
FIGS. 10*a*, 10*b* and 10*c* (together) are schematic circuit diagrams of the logic for comparing data read from the memory with that stored in the scratch pad memory.
Figure 10B:
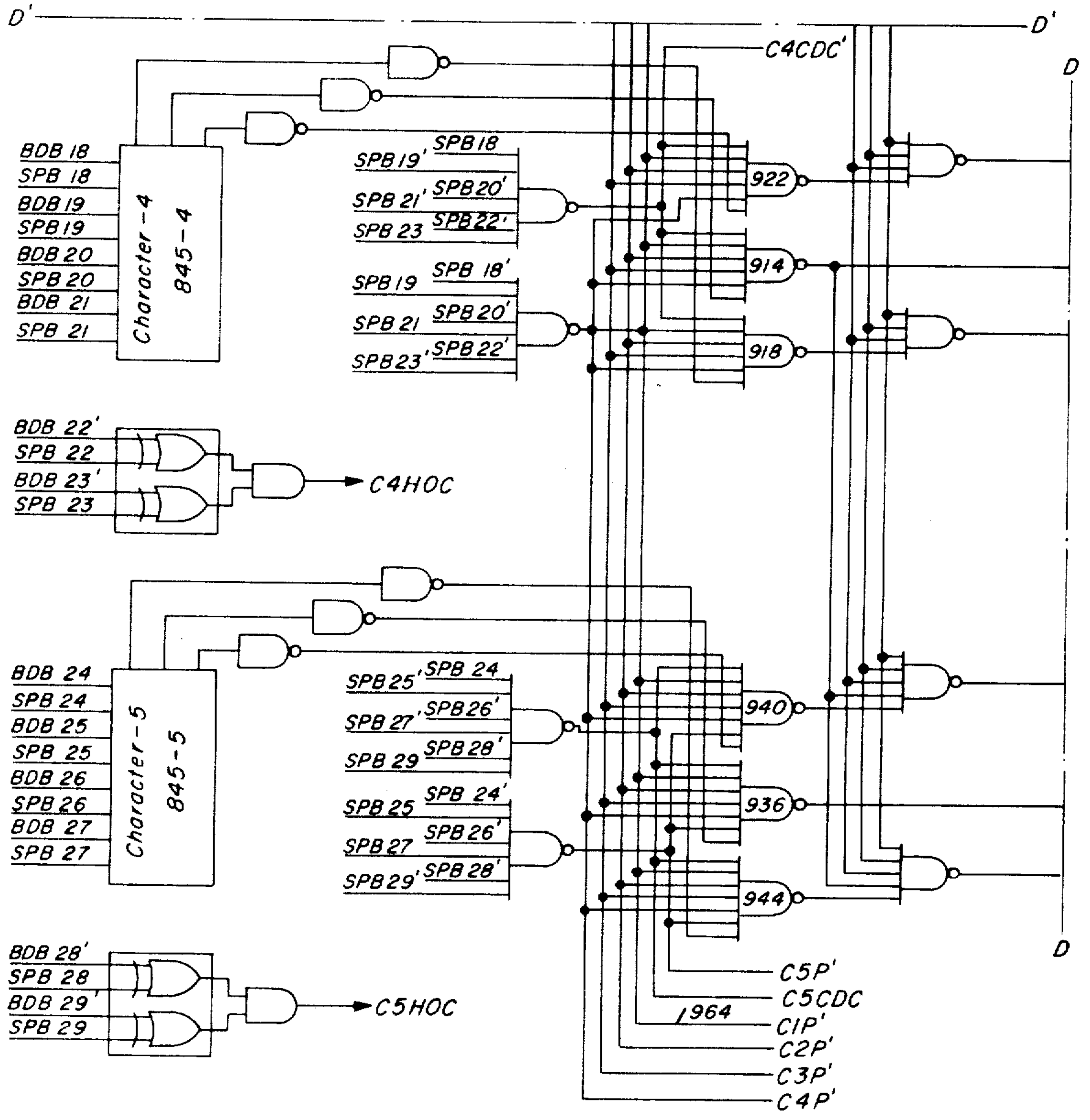

In order to understand how comparison is made between words read from disc and words from the scratch pad memory, reference is now made to FIG. 10.

The 30 data bits are compared in groups of six bits, thus checking the five characters comprising a word.

The first four bits of the first character are fed to four bit binary magnitude comparator 845. Signals from holding register 837 (FIG. 9) are fed to comparator 845 and compared with signals from the scratch pad memory 322 (FIG. 7). A signal from comparator 845 indicating an equality condition is fed through inverter 847 to gate 849. A signal from comparator 845 indicating a "greater than" condition is fed through inverter 851 to gate 853. A signal from comparator 845 indicating a "less than" condition is fed through inverter 855 to gate 857. These three gates are the condition output gates. The last two bits of the first character are checked for equality as follows. A signal from holding register 837 (FIG. 9) as well as a signal from scratch pad memory 323 are fed to gate 859, the output of which is fed to gate 861. A second signal from register 837 as well as a second signal from memory 323 are fed to gate 863, the output of which is fed to gate 861. The output of gate 861 is fed over C1HoC line 865. If the two higher order bits from the first character are the same, line 856 will be energized. If the two higher order bits from the first character do not compare, are not alike, line 856 will not be energized. The remaining four characters of the word are checked in a similar manner.

In order to determine if the first character is to be a "character don't care" condition, signals from the scratch pad memory 323 are fed to gate 954. If character 1 is a "character don't care" symbol, the output from gate 954 is energized. The output signal from gate 954 is fed over C1CDC' line 956 to the "prefix and don't care" logic, to be described in detail hereinafter with reference to FIG. 11. The output signal from gate 954 is also applied as an input to three condition output gates 849, 853 and 857 for this character, thus enabling these gates no matter what the actual comparison on the lower 4 order bits actually is.

In order to determine if the first character is to be a prefix condition, signals from the scratch pad memory output buffer are fed to gate 958. If a prefix condition has been asked for, the output from gate 954 is energized thus enabling the three condition output gates for that character and all following condition output gates. The output signal from gate 958 is fed to gate 849, and is also fed over C1P' line 964 to the "prefix, don't care" comparator, to be discussed in detail hereinafter. The following four characters are checked for a prefix condition in a similar manner, the prefix condition enabling the condition output gates for that character and all following characters. The condition output gates are designated as follows:

| Character | Gate No. | Condition | Symbol |
|---|---|---|---|
| 845-1 | 857 | $X_1>Y_1$ | *a* |
| | 849 | $X_1=Y_1$ | *b* |
| | 853 | $X_1<Y_1$ | *c* |
| 845-2 | 878 | $X_2>Y_2$ | *d* |
| | 870 | $X_2=Y_2$ | *e* |
| | 874 | $X_2<Y_2$ | *f* |
| 845-3 | 900 | $X_3>Y_3$ | *g* |
| | 892 | $X_3=Y_3$ | *h* |
| | 896 | $X_3<Y_3$ | *j* |
| 845-4 | 922 | $X_4>Y_4$ | K |
| | 914 | $X_4=Y_4$ | *l* |
| | 918 | $X_4<Y_4$ | *m* |
| 845-5 | 940 | $X_5>Y_5$ | *n* |
| | 936 | $X_5=Y_5$ | *p* |
| | 944 | $X_5<Y_5$ | *q* |

where $X_1$ is a disc character and $Y_1$ is a search center.

As discussed hereinabove, "character don't care" and prefix conditions can enable these gates even if there is no output from the magnitude comparators. Combination logic is used to solve the following equations: Required Condition $(A \text{"="} B) = behlp$ $(A \text{">"} B) = (a) + (bd) + (beg) + (behk) + (behln)$ $(A \text{"<"} B) = (c) + (bf) + (behm) + (behlq)$ $(A \text{"}\neq\text{"} B) = \overline{(A \text{"="} B)}$ $(A \text{"}\leq\text{"} B) = \overline{(A \text{">"} B)}$ $(A \text{"}\geq\text{"} B) = \overline{(A \text{"<"} B)}$ where A is a word on the disc and B is a search word.

Figure 10C:
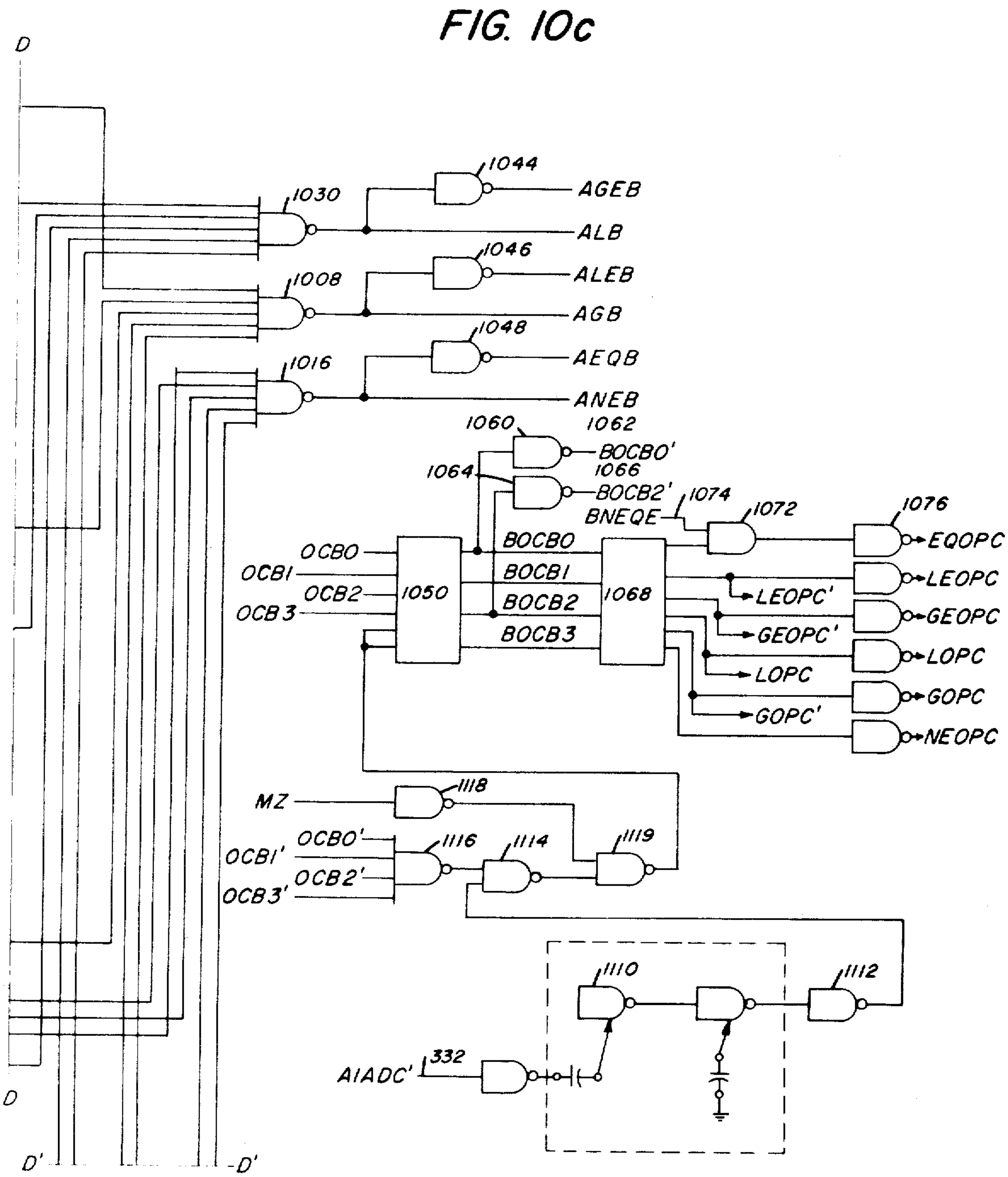

The data bits indicative of the OP code asked for are fed from the scratch pad memory 323 to a 4 bit bistable latch 1050 (FIG. 10*c*). Latch 1050 outputs signals over BOCB lines to an Octal decoder 1068, which is used to decode the binary operations code into one of six lines to indicate the operation code that has been requested for a particular descriptor that is being read from the scratch pad memory and that particular word. The signal traveling over one of the BOCB lines from latch 1050 is also fed through an inverter 1060 to BOCBO' line 1062. The signal traveling over another one of the BOCB lines is fed through an inverter 1064 to BOCB2' line 1066. Octal decoder 1068 outputs a signal, which with a signal traveling over BNEQE line 1074 are fed to gate 1072. This allows either the "equal" OP code or the "but not equal" OP code to energize the EQOPC line. The output signal from gate 1072 is fed through inverter 1076 to "equal to" OP code (EQOPC) line If EQOPC line is energized, the "equal to" OP code has been requested. The rest of the Op codes are determined in a similar manner. The signal traveling over A1ADC' line 332 is fed to one shot 1110 which generates a pulse that is fed through inverter 1112 to gate 1114. Signals from the scratch pad memory 323 are fed over lines OCBO', OCB1', OCB2', and OCB3', to gate 1116 which produces a signal that is fed to gate 1114 when there is an OP code in that particular word of the scratch pad memory. If there is an OP code as determined by gate 1116, then the pulse formed by one shot 1110 will clock the new OP code into the bistable latch 1050. The output signal from gate 1114 is fed to gate 1119, and if there has been no change in the operations code, that is, if all "1's" are read in over lines OCB0', OCB1', OCB2', and OCB3', then the output from gate 1116 will be energized, gate 1114 will not pass a clock pulse and the latch 1050 will retain the same operations code that it previously had. The MZ line is used to clock all "0's" into the latch 1050 during the memory zero operation as has been described hereinabove.

Figure 11:
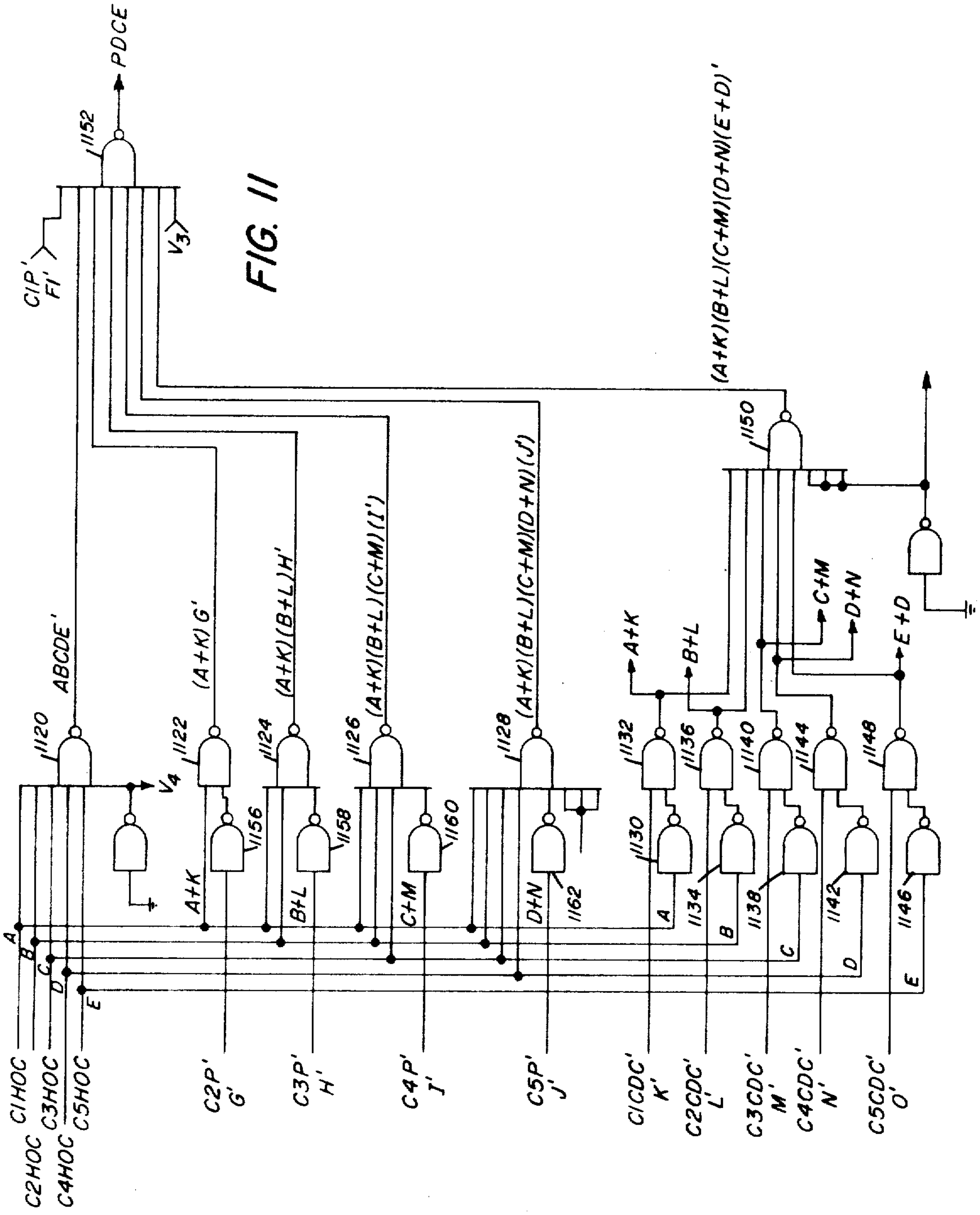
FIG. 11 is a schematic circuit diagram of the logic for combining the higher two order bits comparisons on an individual character.

In order to understand how the two higher order bits in each character are combined, reference is now made to FIG. 11.

It is necessary in combining the higher two order bit comparisons on the individual characters for proper comparison to include the "character don't care" and prefix conditions for individual characters. For example, if a prefix condition is requested, then all high order comparisons for that character position and all following must be ignored. The logic must also be able to handle any case where both "character don't care" and prefix conditions are requested in the same 5 character grouping. FIG. 11 shows the combinational logic and the logical equation that it solves in order to meet all of the required conditions.

A shorthand of the logic of FIG. 11 is listed below:

A=C1HOC
B=C2HOC
C=C3HOC
D=C4HOC
E=C5HOC
F=C1P
G=C2P
I=C4P
J=C5P
K=C1CDC
L=C2CDC
M=C3CDC
N=C4CDC
O=C5CDC

PDCE = (A+K) (B+L) (C+M) (D+N) (E+O)+ (F) + [(A+K) (G)] +[(A+K) (B+L) (H)] + [(A+K) (B+L) (C+M) (I)] + [(A+K) (B+L) (C+M) (D+N) (J)] + ABCDE

The outputs of gates 1120, 1122, 1124, 1126, 1128 and 1150 are combined with signal F' so as to produce signal PDCE as shown above.

Figure 12A:
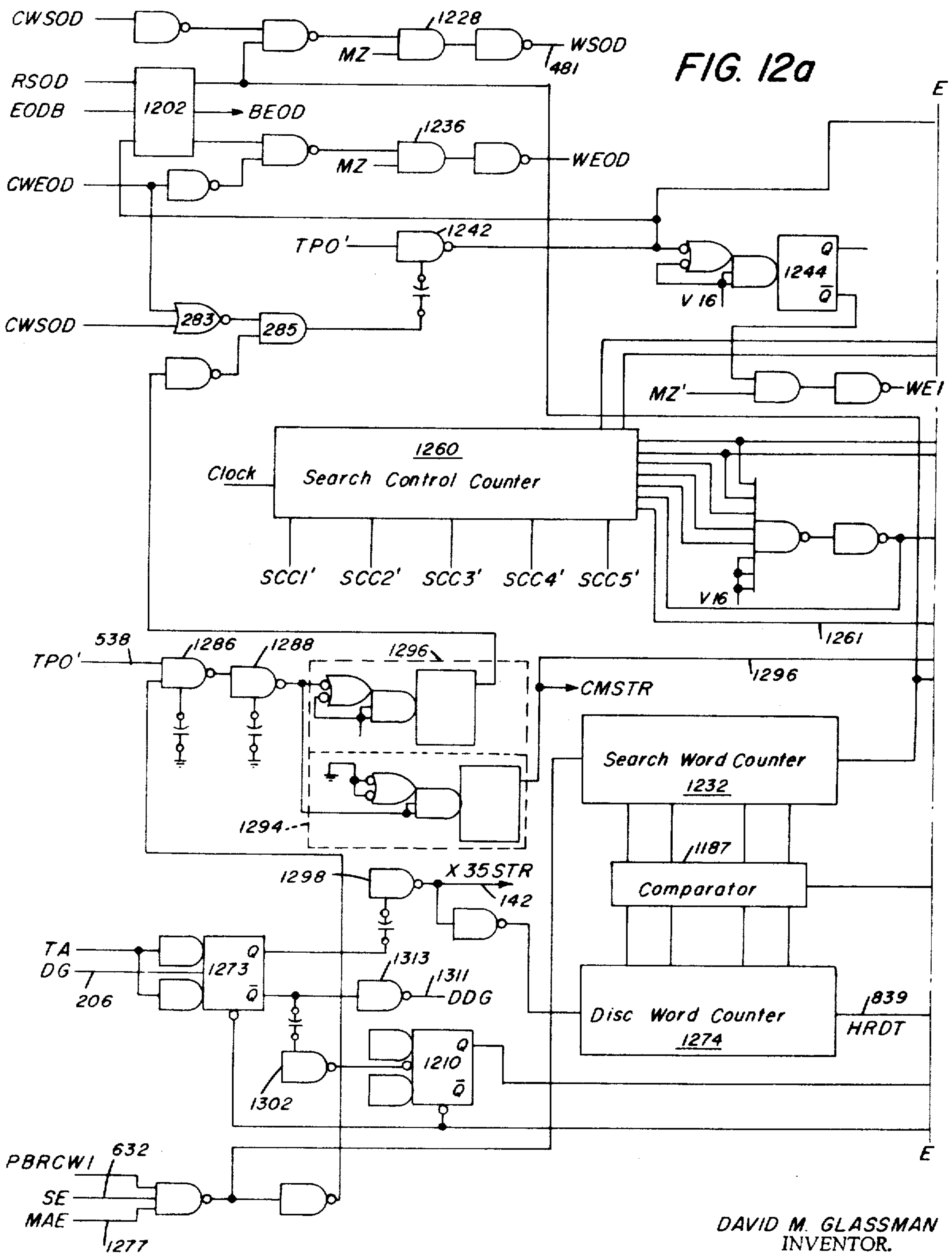
FIGS. 12*a* and 12*b* (together) are schematic circuit diagrams of the search control logic for determining if a word comparison has taken place.
Figure 12B:
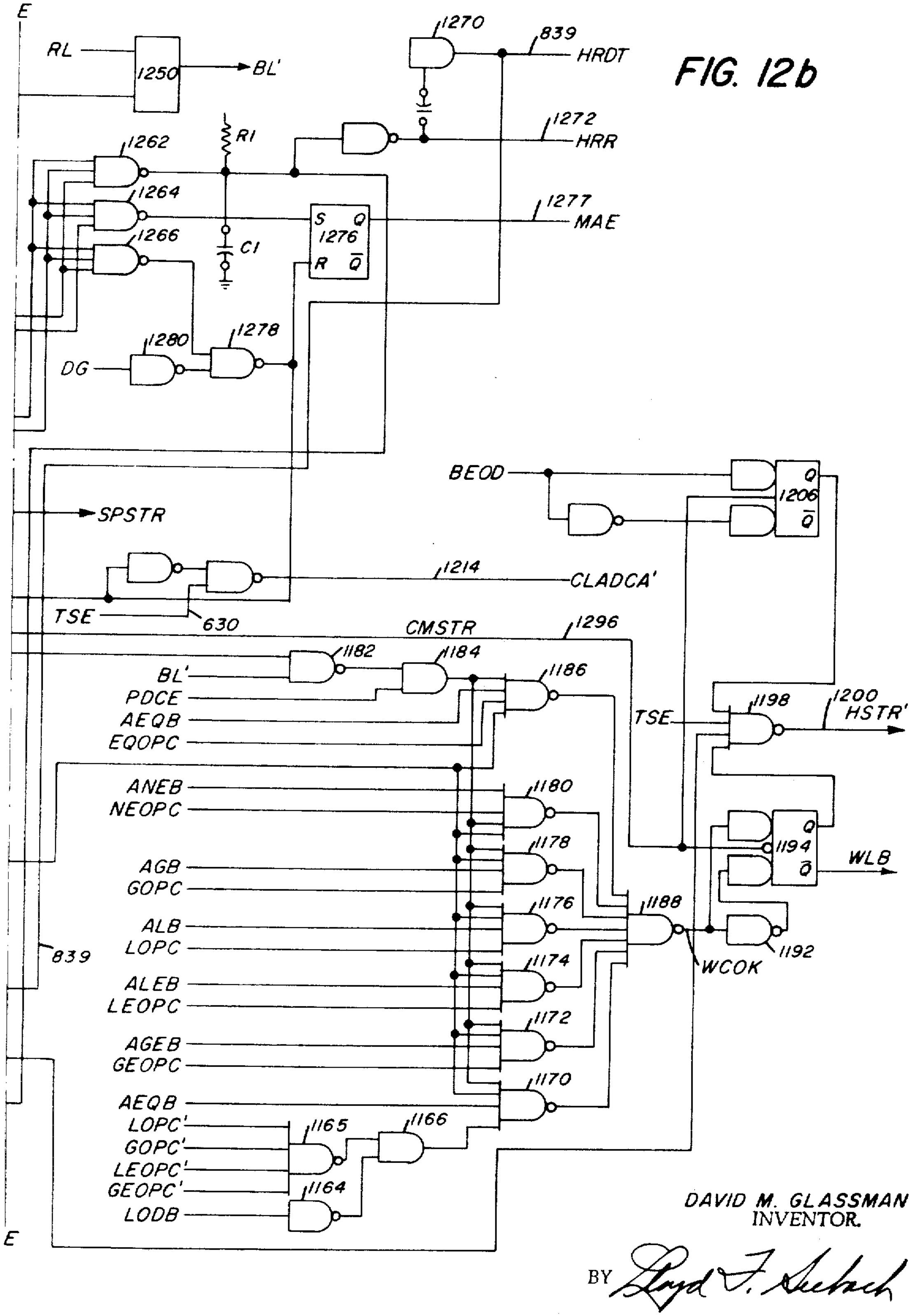

In order to determine if a word comparison has taken place, reference now is made to FIGS. 12a and 12b.

The following must be met for a word comparison to be complete:

1. The word must either be the first search word of a descriptor as determined by the start of a descriptor bit in the scratch pad memory or a link bit must have been recorded in that position from a complete comparison on the preceding disc word and there must be a proper comparison on the high two order bits as determined by the high two order bit comparison logic.
2. The word count comparing the search word to the descriptor word as described hereinabove must match.
3. The proper comparison condition for a requested OP code must exist.
4. If numeric inequalities are asked for, then if there is an equality match in the characters being checked and it is not the end of the descriptor, then the search must continue.

FIG. 12 shows the logic necessary to check these conditions.

Gates 1182 and 1184 are used to check for condition 1 as described hereinabove. The start of descriptor bit is read out of the scratch pad memory and stored in bistable latch 1202 as described hereinbelow. Similarly, the link bit is stored in bistable latch 1250. The high order bit comparisons are provided by the PDCE line as described hereinabove.

The word count condition (condition 2) is determined as follows: The search word counter 1232 is reset by a start of descriptor bit being read from the scratch pad memory, as described hereinbelow. The counter 1232, FIG. 12a, is incremented by the disc read/write clock that gated with search enable SE line 632 as described hereinabove and "memory address enable," MAE line 1277 described hereinbelow. The scratch pad memory is being addressed at the same rate so that the counter 1232 keeps track of the word number of the search descriptor doing the comparisons.

The disc word counter 1274 is reset at the start of a new disc word by the X35STR line 142 pulse to be described hereinbelow. It is incremented once every 35 clock pulses by the HRDT pulse line 839 to be described hereinbelow. This occurs every time a new word is transferred into the holding register 837 described hereinabove with reference to FIG. 9.

These two counters, 1232 and 1274, are compared for an equality match by the comparator 1187. An output from this comparator indicates the search word and disc word are in the same position relative to the start of the descriptor.

Gates 1186, 1180, 1178, 1176, 1174 and 1172 combine the results of conditions 1 and 2 (described hereinabove) and condition 3. The requested OP codes as held in register 1050 described hereinabove with reference to FIG. 10 and the outputs therefrom together with those from gates 1030, 1044, 1008, 1046, 1016, and 1048 (FIG. 10) are combined as shown in FIG. 12b. Gate 1188 will produce an output if conditions 1, 2 and 3 are properly met.

Condition 4 is checked by gates 1165, 1164, 1166 and 1170. Gate 1165 checks to see if any numeric inequality OP codes have been asked for. Gates 1164 and 1166 inhibit the output of gate 1165 if it is the last word of the search descriptor as determined by the end of descriptor bit. Gate 1170 combines condition 4 with conditions 1 and 2 and the combined equality with a signal from gate 1048 over line AEQB enables gate 1188.

Gate 1188 will also have an output if condition 4 is met. The signal from gate 1188 is called the WCOK — word comparison OK signal. If a WCOK signal occurs, it will occur during the scratch pad memory cycle for that work. However, the results of that comparison, so long as it is not the last word of the descriptor, must be stored in the following word of the scratch pad memory. This is accomplished by storing the WCOK signal or lack of it in a one bit shift register 1194 in conjunction with inverter 1192. The clock pulses required to store the WCOK signal and then write it are generated as follows: The same gated read/write clock pulse that increments the search word counter 1232 has delays added to both its leading and trailing edges after passing through gates 1286 and 1288. Gate 1286 is disabled by the TPO' signal during typewriter printout operations to prevent writing of any erroneous information into the scratch pad memory.

The output of gate 1288 is used to trigger two one shots. One shot 1294 fires on the leading edge of the clock pulse and one shot 1296 fires on the trailing edge of the same clock pulse. The output of one shot 1294 (CMSTR) is used to clock the WCOK signal into the one bit shift register 1194 as described hereinabove. The output of one shot 1296 triggers one shot 1242 so long as the typewriter is not in a printing operation. The output of one shot 1242 is used to load the End of Descriptor bit (EODB), Start of Descriptor bit (R-SOD), and link bit (RL) into bistable latches 1202 and 1250. One shot 1242 also triggers one shot 1244 which produces the WE1 pulse which initiates a writing cycle in that section of the scratch pad memory that holds the EOD bit, SOD bit, and link bit. This operation is necessary to write the new link bit, if any, into the scratch pad memory. Since it is desired to retain the EOD bit and SOD bit in the scratch pad memory, the outputs of the bistable latch 1202, are connected back to the appropriate inputs of the scratch pad memory so that these bits will be rewritten in the correct location in memory. Provision is also made with gates 1228 and 1236 to provide for entering zero data when doing a memory zero operation.

Certain other signals are required to control the search logic. It takes 35 clock pulses to shift a new word of data from the disc. At the end of this time a pulse must be produced to control the transfer of this data to the 30 bit holding register 837 as described hereinabove with reference to FIG. 9. There are only 32 words in the scratch pad memory to be compared to the single word in the holding register. Since the scratch pad memory is addressed at the same rate as the data is being clocked through the serial shift register as described hereinabove, means must be provided to properly gate the clock pulses for this purpose. The search control counter 1260 provides for this function and is a 6 bit counter that counts 35 states and on the 36th input clock pulse resets itself to its first state. Gate 1266 decodes this 35th state and provides the reset signal for the search control counter 1260 via line 1261. The data gap signal from the disc is also used as a reset for this counter since there are extra clock pulses at the end of every data block on the disc that must be ignored. Gates 1280 and 1278 provide the combination of the data gap reset and the reset from gate 1266 described hereinabove. This combined reset is also used as one of the resets for the scratch pad memory address counter. This reset is only used when the logic is in a search mode as determined by Track Search Enable (TSE) line 630. The reset signal to the memory address counter is CLADCA' line 1214 (FIG. 12*b*).

To select the 32 clock pulses out of 35 that are needed to control the comparison of the 32 words in the scratch pad memory against the one word in the holding register 837, gate 1264 decodes the required state of the search control counter and sets flip flop 1276, activating the MAE line 1277. Flip flop 1276 is reset by the same digital that resets the search control counter 1260 described hereinabove. Two other signals that are needed for controlling the search operations are also generated by search control counter 1260. Gate 1262 decodes the same state of the counter 1260 that gate 1266 does, however, $R_1$ and $C_1$ are used to stretch the output pulse of gate 1262. This pulse is used to reset the data gap delay circuits to be described hereinbelow and is also used (HRR line 1272) (see FIG. 5*b*) to generate the descriptor counter reset pulse (DRRST) line 1317. If flip flop 212 has not been set (see FIG. 5*b*), then the gate 225 is enabled and gate 227 will produce the DRRST pulse whose uses will be described in conjunction with FIGS. 13 and 14. One shot 233 (FIG. 5*b*) produces a pulse at the end of the track origin region that also produces an output from gate 227 — DRRST.

At the conclusion of the HRR pulse 1272, one shot 1270 produces a HRDT pulse 839. This pulse controls the transfer of data from the serial input register 754 to the 30 bit bistable latch 837, see FIG. 9. This pulse is also used as the clock pulse for the disc word counter 1274 described hereinabove.

Other signals that are needed to control the search logic are generated by the data gap delay circuits and are described with reference to FIG. 12. During the time that is defined as "track active" as described hereinabove, flip flop 1273 can be clocked by the Data Gap signal 206. Flip flop 1273 is set at the end of every data gap signal and reset by HRR'. When flip flop 1273 is set, one shot 1302 fires. At the conclusion of this pulse, flip flop 1210 is set. Flip flop 1210 is also reset by HRR'. This action of setting and resetting flip flop 1210 produces a signal whose start is delayed from the end of the data gap signal by the width of the pulse produced by one shot 1302. This signal indicates that the last word of a disc descriptor is now in register 837 (FIG. 9) and is being compared to the search descriptors stored in the scratch pad memory. When flip flop 1273 is reset, one shot 1298 fires, producing a pulse that resets the disc word counter and is also used as X35STR line 142 to intergate decoding gates in various parts of the system as to what data is contained in them when a disc word has been completed and shifted into register 754 (FIG. 9).

The final determination that a descriptor has completely satisfied all requirements to be accepted as an answer to the search request is made as follows with reference to FIG. 12*b*. Gate 1198 is used to check that all of the following conditions have been met:

1. The last word of the disc descriptor is being compared. Flip flop 1210 must be set.
2. A search is being performed as indicated by TSE being set.
3. The last word of a search descriptor is being compared to the disc descriptor. An end of descriptor bit will be read from the scratch pad memory and stored in latch 1202 as BEOD. This will be shifted into register 1206 by the CMSTR pulse which is described hereinabove. The output of register 1206 appears as an input to gate 1198.
4. The final condition that must be met is that a work comparison OK as described hereinabove must exist. This is stored by register 1194 which is also clocked by CMSTR. The output of register 1194 is the final input to gate 1198.

If all four conditions are met, then a descriptor hit strobe(HSTR' line 1200) is generated. How this pulse is used will be described with reference to FIGS. 13 and 14.

Figure 14:
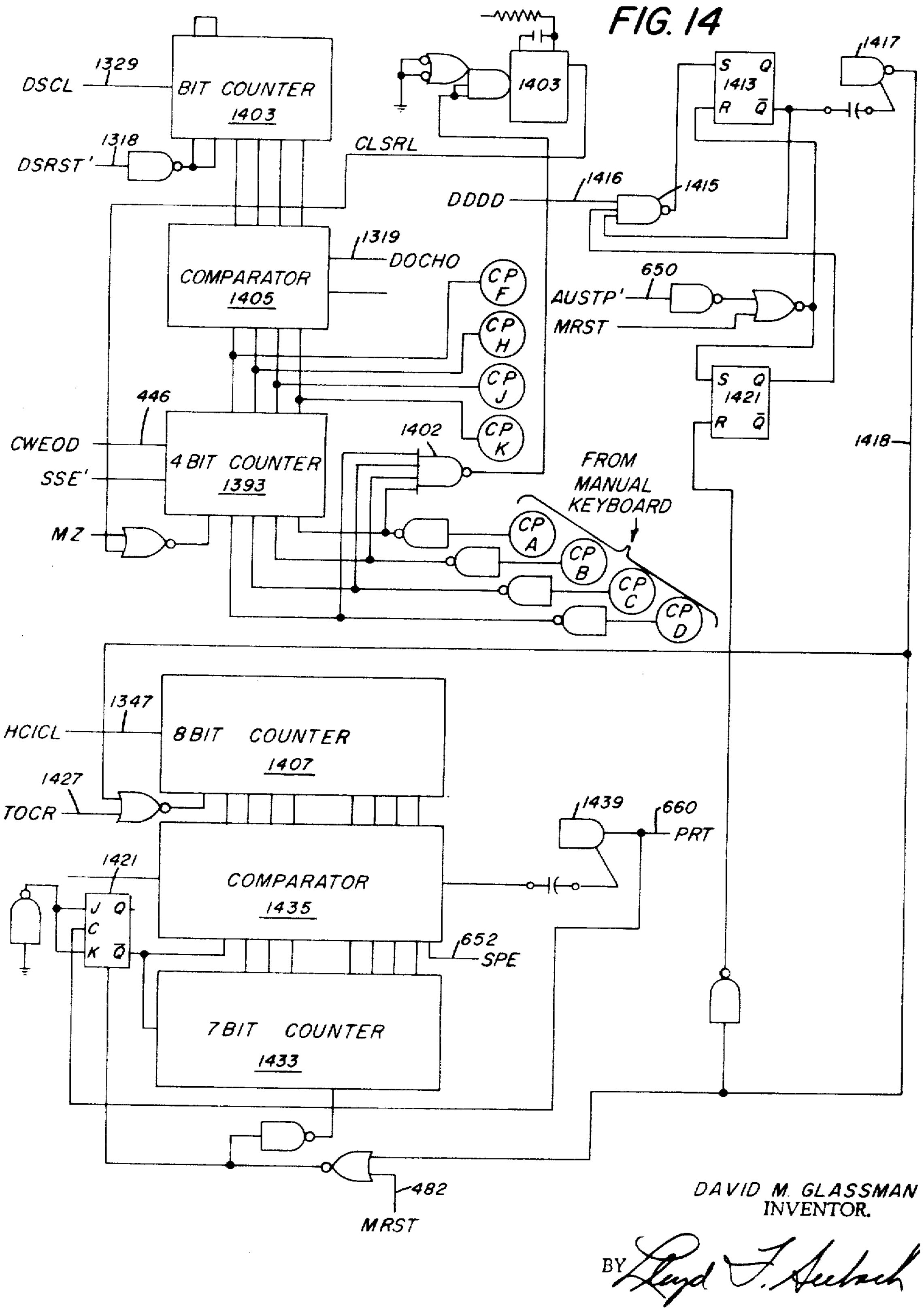
FIG. 14 is a schematic circuit diagram of the logic control for print-out of the fulfilled search request.

In order to better understand the search control logic and in particular the logic necessary to handle the prefix and "but not equal" conditions and also how a record hit is generated, reference is now made to FIG. 14. The basic mechanism of determining a record hit is based on keeping track of the number of descriptor hits that have been found within a single record and comparing this number to a number that has been stored in a second counter that keeps track of the number of search requests that have been made by the operator. The number of search requests made by the operator are stored in a counter 1393. This counter is incremented every time the operator enters a search request by depressing the carriage return key on the typewriter. This produces the CWEOD pulse line 446 as described hereinabove. As long as the logic is not in the search mode, then the CWEOD pulse can increment this counter. The ability to clear the counter 1393 is necessary since it may be desired to preset this counter to some number less than the number of descriptors typed in by the user. This is done to allow the majority logic type of search. For example, the user may have typed five search questions but would be satisfied if only three of them were present. The operator would then depress any key on the manual keyboard and gate 1402 would detect the presence of any one of the keys being depressed and would trigger one shot 1403 which clears the counter 1393. The pulse from one shot 1403 is a very short pulse and when this pulse has ended, the operator's key to set a new number into counter 1393 will still be depressed, and this will preset counter 1393 to the requested number. If the operator sets the counter 1393 to the number "1," he has a logical OR search. If he sets counter 1393 to the same number as the number of descriptors that he has typed in, he has the full AND search. Any number between these two limits will give him a majority type of search.

Figure 13:
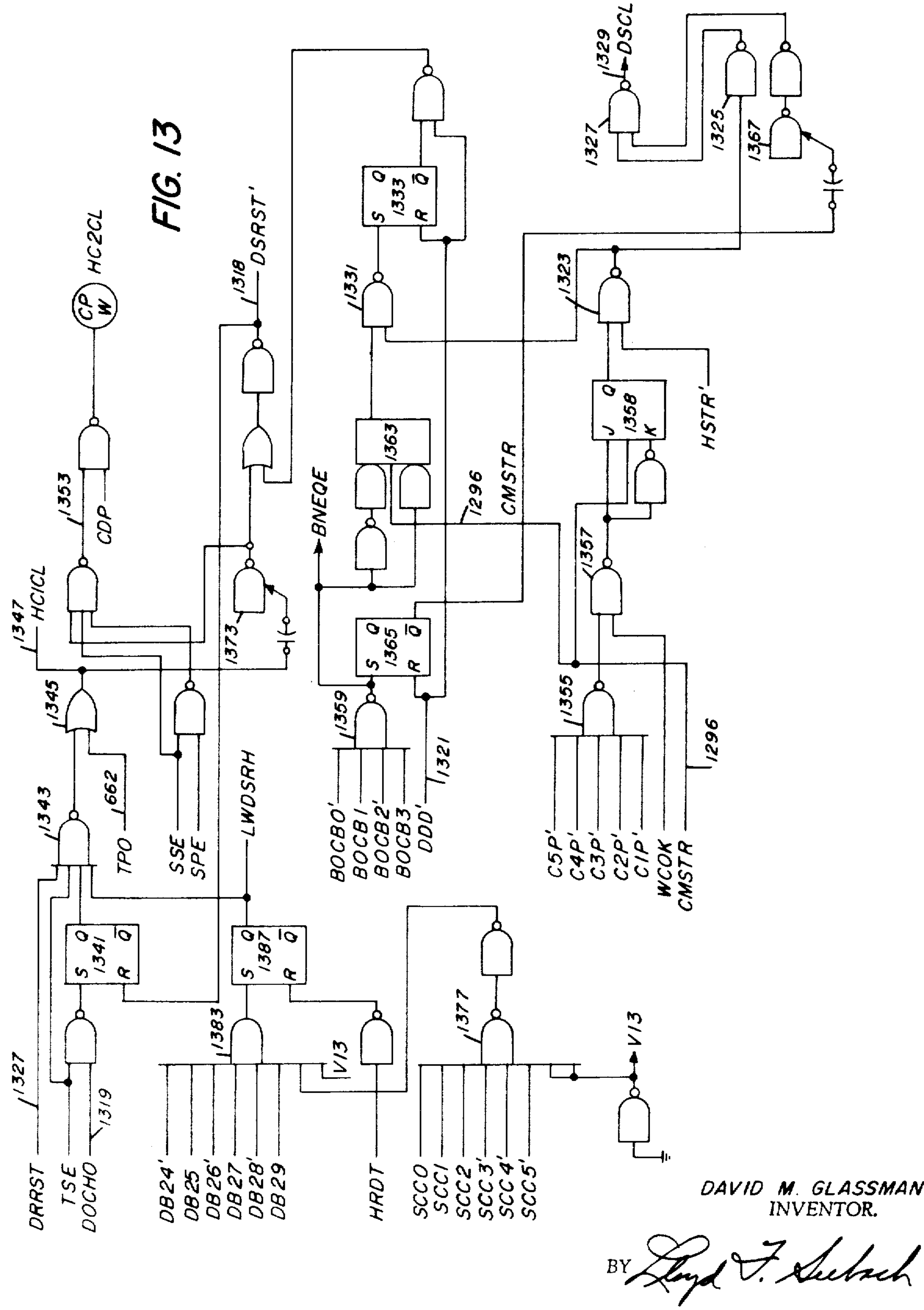
FIG. 13 is a schematic circuit diagram of the control logic for incrementing the document hit counter.

The discussion that follows describes the various mechanisms in which the descriptor hit counter 1403 may be incremented with reference to FIG. 13. If a normal search has been performed with no unusual conditions, such as a "prefix" or "but not" also being wanted and if all of the search conditions have been satisfied as described hereinabove, with reference to FIG. 12*b*, a HTSR' signal will be generated. This signal passing through gates 1323, 1325, 1327 will produce a DSCL pulse to clock counter 1403 (FIG. 14) and for every such descriptor hit strobe, counter 1403 will be incremented. If a prefix search has been requested, then the following logic is used. Gate 1355 detects the presence of any prefix condition asked within the five character group. Gate 1357 checks to see if both a prefix condition has been asked and that there is a proper word comparison for that word in addition to a prefix condition being asked. If both of these conditions are satisfied, gate 1357 feeds a pulse to one bit shift register 1358 which is clocked by the CMSTR pulse line 1296 as described hereinabove. This one stage shift register is necessary to provide the same timing on a prefix hit as occurs on a normal hit strobe as has been described hereinabove with reference to FIG. 12b. The output of the one bit shift register 1358 will also produce a DSCL pulse through gate 1327 to clock counter 1403 as described hereinabove with reference to FIG. 13. If a "but not" search has been asked for, then the following logic is used,again with reference to FIG. 13. Gate 1359 decodes the "but not equal" operation code as held in register 1050 shown in FIG. 10*c*. When a "but not equal" operation code is detected, flip flop 1365 will be set. The action of setting this flip flop will cause one shot 1367 to produce a pulse which also increments the descriptor hit counter 1403 (FIG. 14). It is necessary to increment this counter to one extra state since the search request counter 1393 has received an extra count as the operator has been entering the search requests. The fact that a "but not equal" OP code has been requested is also stored in one bit shift register 1363. This shift register is also clocked by the CMSTR signal line 1296. This again is necessary to give this signal the same timing as the HSTR signal and the prefix signal from register 1358. If a "but not equal" OP code has been requested and is stored in register 1363, and a hit strobe or prefix signal occur at the output of gate 1323, gate 1331 will set flip flop 1333. If flip flop 1333 is set, then counter 1403 (FIG. 14) will be reset by the DSRST' signal line 1318. This reset will remain on counter 1403 until the next record is detected and the DDD' signal line 1321, to be described hereinbelow with reference to FIG. 14, resets flip flops 1365 and 1333.

It is now necessary to determine when an actual record hit has occurred. Counter 1393 is holding the number of search requests requested by the operator. Counter 1403 is counting the number of search descriptors that have been answered by a given record. When the numbers contained in these two counters are equal, a comparator 1405 will produce an output on DOCHO line 1319. When this signal occurs, if the logic is in a "track search enable" mode, flip flop 1341 (FIG. 13) will be set. It is also necessary to check that the last word of the last descriptor for that record is also occurring. This is checked by flip flop 1387 which is set by gate 1383 which decodes the first six bits of the input shift register. Gate 1383 will also set flip flop 1387 when a dot code is found. The clocking signal for this gate is provided by gate 1377 which decodes the proper state of the search control counter. When the last word of the search flip flop 1387 is set and if flip flop 1341 is set signifying that there has been a correct number of descriptor hits found and if the logic is in a "track search enable" mode, gate 1343 will receive an output from the DRRST pulse line 1317. This signal has been described hereinabove with reference to FIG. 5*b*. Gate 1343 will produce an output at gate 1345 so long as the unit is not in a "type out" mode as determined by the TPO signal line 662. This signal on line 1347, the HC1CL pulse, is used to increment the record hit counter 1407 to be described hereinbelow with reference to FIG. 14. At the conclusion of this pulse, one shot 1373 produces a pulse which is used to reset flip flop 1341 for the next record search and also to produce a signal on line 1353, the HC2CL signal, which increments a display counter on the control panel to tell the operator the number of record hits determined.

In order to understand the base printout logic control, reference is made to FIG. 14. Since there is no mechanism by which the disc may be stopped from rotating while a printout is taking place, and since any printout will take a considerably longer time than it takes for the disc to make one revolution, it is necessary to provide some means by which it is possible to stop the search and cause a printout, and then for the search to be picked up again where it left off when the printing operation was initiated.

This is accomplished as follows. Counter 1407 is used to keep track of the number of record hits located on a given track. The signal that clocks this counter travels along HC1CL line 1347. Counter 1407 is reset by one of two mechanisms. It is reset at the beginning of each new track when a dot code is detected, which signifies the beginning of a new record or after a printout operation has been completed and a signal is presented on TOCR line 1427. It is necessary to reset it at the beginning of a record on the new track to allow for the case in which descriptors from a record may be contained at the end of one track and the beginning of a new track. This reset will be discussed hereinbelow.

Counter 1433 keeps track of the number of documents that have been printed out for that particular track. Its sequence of operation is as follows: At the beginning of each new track when counter 1407 is also reset, counter 1433 is preset to a condition of all zeros with the exception of the first stage, the least significant bit, which has been preset to a count of one. The sequence of operation is then as follows: When the first document hit on a track is located, counter 1407 will be set to a count of one. Comparator 1435 compares the numbers in counters 1407 and 1433. If there is a match between counter 1407 and 1433, and the unit is in the print enable mode by reason of a signal on SPE line 652, comparator 1435 will output a signal that is fed to one shot 1439 which, in turn, will provide a signal on PRT line 660. The output pulse from one shot 1439 is also fed to the clock input of counter 1433, incrementing counter 1433 to its next state. The PRT signal will be fed to logic that causes the core memory buffer to pass its information that has been stored in it to the typewriter for the printing operation.

The record print-out counters 1407 and 1433 are reset in the following manner. The MRST signal line 482 is provided as a manual reset to insure that all circuits are in their proper state for automatic operation. The MRST signal resets counter 1433 and flip flop 1413 and sets flip flop 1421. When flip flop 1421 is set and flip flop 1413 is reset, gate 1415 is enabled. When a dot signal is detected and the core memory has finished a complete cycle as described hereinbelow with reference to FIG. 15, a signal on DDDD line 1416 will set flip flop 1413. When flip flop 1413 is set, one shot 1417 produces a pulse to reset counters 1407 and 1433 and flip flop 1421. No further resets can now occur on this line, 1418, until the disc head has been stepped to the next track signifying that all search and printout operations on that track have been completed. AUSTP' 650 provides the signal to set flip flop 1421 and reset flip flop 1413, re-enabling gate 1415.

The sequence of operations that is followed in finding and printing out records is as follows:

1. Counter 1407 is reset to a state of 0.
2. Counter 1433 is preset to a state of 1.
3. A record is found, incrementing counter 1407 to state 1, causing a print command PRT and incrementing counter 1433 to a state of 2.
4. When typing is completed, counter 1407 is reset to a state of 0.
5. For the next record to be printed, two record hits must be found in order to get a print command.
6. This sequence of operation repeats with counter 1433 always being incremented by 1 while counter 1407 always resets and must then count up to the new number contained in counter 1433.
7. This continues until the disc head is stepped to the next track and the sequence is then restarted.

Figure 15A:
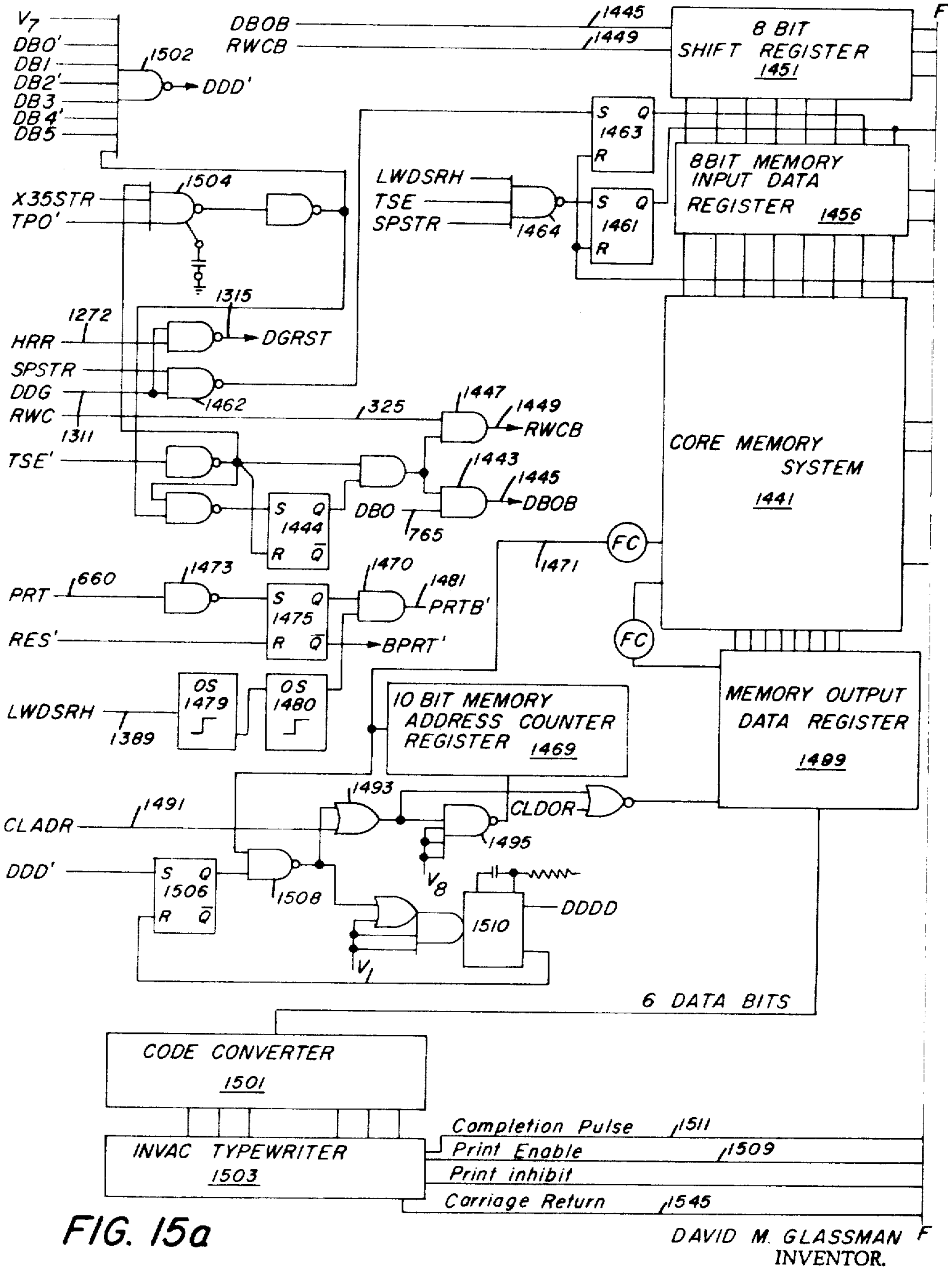
FIGS. 15*a* and 15*b* (together) are schematic circuit diagrams of the control logic for the transfer of data into a core memory for print out.
Figure 15B:
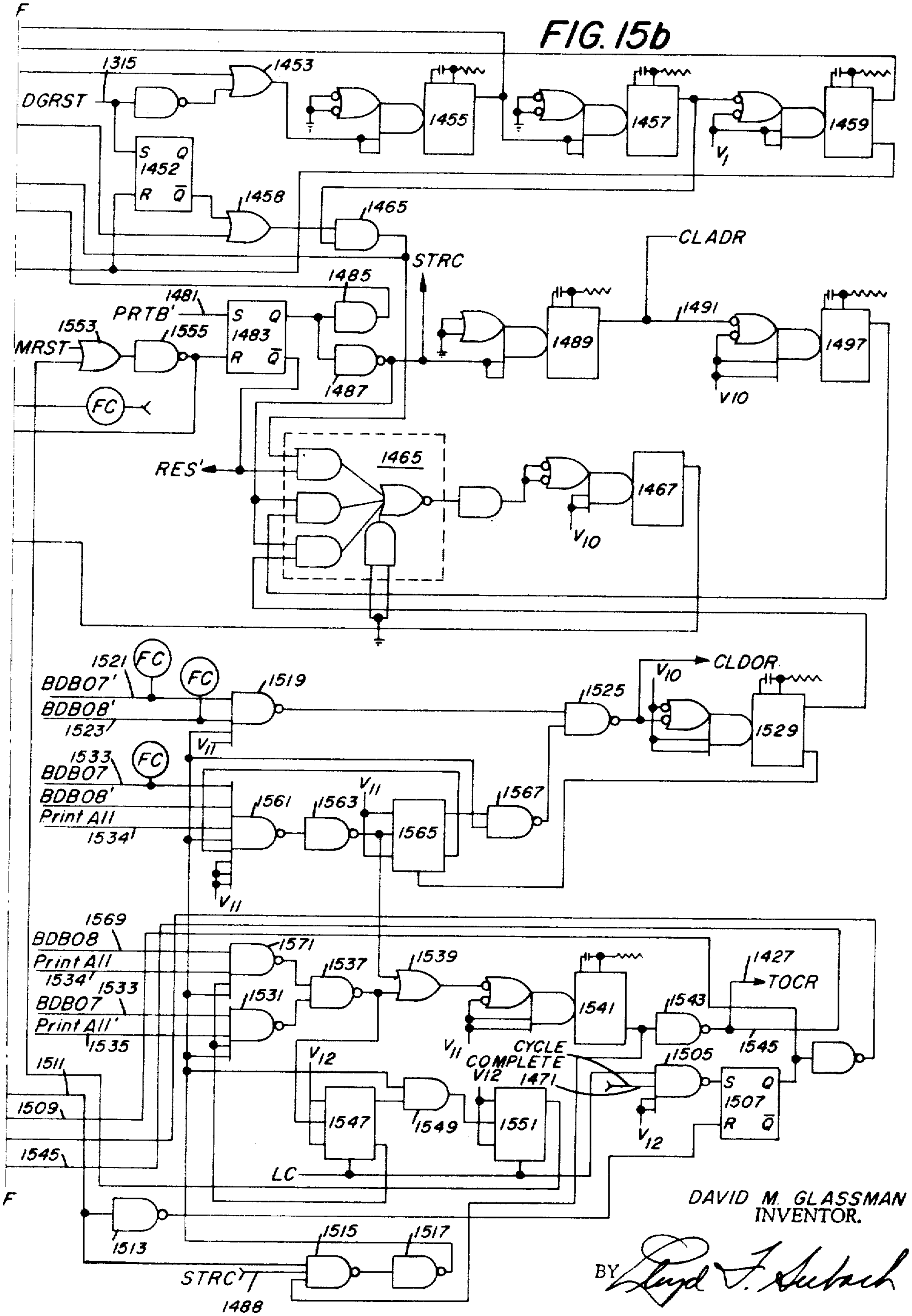

For the transfer of data into a core memory and then to a typewriter for printout, reference is now made to FIGS. 15*a* and 15*b*. Core memory 1441 has a capacity of 1,024 words, each word being 8 bits long. The core memory word of eight bits is broken down as follows: Six bits are used for data and two bits are used for control. The two control bits are as follows: The first bit indicates that it is the end of a data block on the disc, a data block being either a title block or a descriptor block. The second control bit indicates that it is the end of the record. These two control bits are determined as follows: the end of a date block is sensed by the setting of flip flop 1273, as described with reference to FIG. 12*a*, and is strobed by the SPSTR line which is a special output of the search control counter 1260. Gate 1462 provides a signal indicative of the end of a data block and this signal is used to set flip flop 1463 which serves as input data for data register 1456. Gate 1464 uses the LWDRSH signal, as described with reference to FIG. 13, and the SPSTR strobe to set flip flop 1461 which then indicates that the last character of a record is being transferred into core memory system 1441.

Data bits from the output of shift register 754 (see FIG. 9) travel along DBO line 765 and are fed to gate 1443. Signals traveling along RWC line 325 are fed to gate 1447.

At the beginning of every track there is a one to two bit wide data pulse and four clock pulses that define the track mark pulse, see FIG. 3. These must be excluded from the core memory logic. By setting flip flop 1444 on the first X35STR pulse after track search enable flip flop 626 has been set (FIG. 4*b*) and using the output of flip flop 1444 to enable gates 1443 and 1447, only the data and clock pulses occurring after the track mark will be present in the core memory logic.

Data is fed serially along DBOB line 1445 to shift register 1451. Clock pulses are fed to shift register 1451 over RWCB line 1449. Register 1451 is an 8 bit serial in, plus parallel load-parallel out shift register. Every seventh bit traveling over DBOB line 1445 to shift register 1451 will be disregarded, since it is the parity bit. The manner in which shift register 1451 operates is as follows: The shift register 1451 is preset to a condition of all zeros with the exception of the first bit which is preset to a condition of one. Data is then shifted into shift register 1451 over DBOB line 1445. The necessary clock pulses travel over RWCB line 1449. When a "one" is sensed in the eighth position of shift register 1451, signifying that seven bits have been shifted into this register, shift register 1451 outputs a signal that is fed to gate 1453. One shot 1455 outputs a pulse that is fed back to shift register 1451, which conditions it for a loading operation. The output pulse from one shot 1455 is also fed to one shot 1457 which, in turn, provides an output to register 1456 to condition it for loading with the data contained in register 1451 and also to one shot 1459 whose output is fed back to shift register 1451. This causes resetting of shift register 1451 and preloading shift register 1451 to a state of a one in the first bit and all zeros in the succeeding bits so that it will be ready for the following operation. A reset output pulse from one shot 1459 is fed to the reset input of flip flops 1461, 1452, and 1463.

The output from one shot 1457 is also used to initiate a writing cycle in core memory 1441. However, there is one condition when this cycle is not to occur. Because of the extra clock pulses at the end of a data block, the eight bit shift register 1451 must be cleared before a new data block is shifted in. The signal to activate the timing chain (1455, 1457, and 1459) is derived as follows: With reference to FIG. 12*a* gate 1313 follows the action of flip flop 1273 with the exception that the end of the signal is delayed by the action of gate 1313. This delayed signal DDG line 1311 in conjunction with the HRR pulse line 1272 forms the DGRST signal line 1315 which occurs 35 bit times after the end of a data gap region. This is just before new data becomes available to the shift register 1451. DGRST line 1315 activates the timing chain (1455, etc.) and also sets flip flop 1452 which disables gate 1458, to prevent a memory cycle from being started. Flip flops 1461 and 1463 are reset by one shot 1459 whose pulse occurs after the pulse to initiate a memory write cycle.

The output signal from gate 1458, which is to indicate that the start of a writing cycle is to take place, is fed to gate 1465 which provides a signal that is fed to one shot 1467. One shot 1467 outputs a pulse that is fed to core memory 1441 for initiating transfer of the data that is stored in data register 1456 to the core memory 1441. At the conclusion of this writing cycle, the core memory 1441 will be addressed to its next word. This is accomplished by means of memory address counter/register 1469 which is incremented every time core memory 1441 produces a cycle complete signal over cycle complete line 1471. The cycle complete signal is generated by core memory 1441 at the conclusion of either a write cycle or a read cycle.

It is required to be known when the first word of a title block has been totally shifted into register 754 (FIG. 9). Gate 1502 decodes the last 6 bits of register 754 looking for the dot code. The strobe signal for gate 1502 is generated in gate 1504. The necessary enabling signals are TSE and TPO'. The X35STR signal exists at the time a complete word has been shifted into register 754. A slight delay is added at this signal in gate 1504 and this is the strobe signal applied to gate 1502. When a dot code is detected at the end of register 754, gate 1502 will provide a signal DDD which, in turn, sets flip flop 1506. If flip flop 1506 is set, gate 1508 will produce an output pulse during the next cycle complete signal from core memory 1441. This signal is used to clear the memory address counter register 1469 and the memory output data register 1499. This is necessary because the dot code signifies that a new record is about to be examined. At the conclusion of this pulse, one shot 1510 is triggered and produces the DDDD pulse which resets flip flop 1504 and is also used to reset counters 1407 and 1433 (FIG. 14).

When the logic unit is in the printout mode, the following sequence occurs. Data is being loaded into core memory 1441 from data register 1456 during the time that a search is taking place. At the time that the last character is being written into core memory 1441 a signal traveling over PRT line 660 is fed through inverter 1473 to set flip flop 1475. The signal traveling over PRT line 660 indicates that it is desired to read out the information that has just been loaded into core memory 1441. The set output of flip flop 1475 is fed to gate 1477.

LWDSRH line 1389 is used to trigger one shot 1479 which, in turn, triggers one shot 1480. The timing on these one shots produce a pulse that occurs immediately after the memory cycle writing the last character into core memory has been completed. This signal in conjunction with flip flop 1475 being set produces the PRTB' signal 1481.

Gate 1477 outputs a signal over PRTB' line 1481 that sets flip flop 1482, the set output of flip flop 1483 is fed through inverter 1485 to data register 1456, inhibiting all further transfers from data register 1456 to core memory 1441. When the signal from inverter 1485 is fed to data register 1456 zeros are written into core memory 1441. The set output of flip flop 1483 is also fed to one shot 1489. One shot 1489 outputs a pulse that is fed over CLADR line 1491 to gate 1493. The output signal from gate 1493 is used to clear memory address counter/register 1469 to all zeros so that the first character written into core memory 1441 will be the first character to be read out of the memory. The output pulse from one shot 1489 is also fed to one shot 1497. One shot 1497 outputs a pulse that is fed to gate 1465, producing a signal that causes a read cycle in the core memory 1441. Data is now transferred from core memory 1441 to memory output data register 1499. The output from memory output data register 1499 is fed to code converter 1501. The data being held in code converter 1501 is then ready to be transferred to typewriter 1503 when the appropriate signal has been given. The signal traveling over cycle complete line 1471 is fed to gate 1505. Gate 1505 outputs a signal that is fed to flip flop 1507, setting flip flop 1507. The set output of flip flop 1507 is fed along print enable line 1509 to the typewriter 1503 to cause it to print out the data that typewriter 1503 has had on its input lines. When typewriter 1503 has finished typing a character, it sends a completion pulse over CP line 1511 through inverter 1513 to the reset input of flip flop 1507, resetting flip flop 1507.

The signal traveling over CP line 1511 is also fed to gate 1515. The signal traveling over STRC line 1488 is also fed to gate 1515. If the logic is in the printout out mode, STRC line 1488 will be energized. Another signal appearing at gate 1515 is derived from one shot 1541 if the logic is such that a carriage return function exists at that moment. The generation of this carriage return function will be discussed hereinafter in detail. Gate 1515 outputs a signal that is fed through inverter 1517 to gate 1519, if there is no carriage return signal present.

A signal traveling over BDBO7' line 1521, the inverse of the seventh bit, which is indicative of a carriage return is fed to gate 1519. A signal traveling over BDB08' line 1523, the inverse of the eight bit, indicative of the end of a data block signal, is also fed to gate 1519. The output of gate 1519 is fed to gate 1525. If neither a carriage return nor "end of data block" signal are present, then gate 1519 will cause a CLDOR pulse to occur at the output of gate 1525. This signal causes the data output register to be cleared and ready to accept new data from core memory. The output signal from gate 1525 is also fed to one shot 1529. One shot 1529 outputs a pulse that is fed to gate 1465, causing the initiation of a new read cycle for core memory 1441.

There are two further conditions that can occur that are modified by the mode of printout the operator desires. The first mode is the mode in which the operator selects a "print title only" mode. In this case, the output signal from inverter 1517 is fed to gate 1531 which looks for the first carriage return signal and then produces a carriage return to return control to the main search logic to print out no further information. Gate 1531 looks for a 1 in the carriage return control bit location from core memory 1441. This signal is fed to gate 1531 over BDB07 line 1533. A "print all prime" signal is fed to gate 1531 over "print all prime" line 1535. Gate 1531 outputs a signal that is fed to gate 1537. Gate 1537 outputs a signal that is fed to gate 1539. The output signal from gate 1539 is fed to one shot 1541 which produces a pulse that is fed through inverter 1543 over carriage return line 1545 to typewriter 1503. The output signal from inverter 1543 is also fed over type out carriage return (TOCR) line 1427 to reset counter 1407 (FIG. 14). The output pulse from one shot 1541 is also fed to gate 1515 to inhibit any further action until the typewriter carriage return is complete.

The output signal from gate 1537 is also fed to flip flop 1547, setting flip flop 1547. The set output of flip flop 1547 is fed to gate 1549. The other input to gate 1549 is the signal from inverter 1517. The output of gate 1549 is fed to flip flop 1551. When said completion pulse is returned from the typewriter stating that the carriage return action has been completed, flip flop 1551 will be set. The set output of flip flop 1551 is fed to gate 1553. Gate 1553 outputs a signal that is fed through inverter 1555 to the reset input of flip flop 1483. The reset output signal of flip flop 1483 is called RES' and is fed to flip flop 1475, resetting flip flop 1475. The reset output signal from flip flop 1475 is fed over BPRT' line 1559 and resets print flip flop 658 in logic discussed earlier with reference to FIG. 4a and returns control to the search and enable logic.

Let us next consider the case in which the operator has selected the print all mode. The output pulse from inverter 1517 is fed to gate 1561 which looks for the condition in the control bits that there is a carriage return control bit but not an end of document bit. A signal is fed over BDB07 line to gate 1561 which indicates the presence of a carriage return bit. A signal is fed over BDB08' line which indicates the presence of an end of record bit. The print all signal is fed to gate 1561 over PA line 1534. When the condition is met that there is a carriage return bit but not an end of record bit, gate 1561 outputs a signal that is fed through inverter 1563 through gate 1539 which, in turn, causes the carriage return signal as described hereinabove. The output signal from inverter 1563 is also fed to flip flop 1565, setting flip flop 1565. The set output of flip flop 1565 is fed to gate 1567. The output signal from inverter 1517,via gate 1515 indicating a completion pulse over line 1511 from the typewriter, is also fed to gate 1567. Gate 1567 outputs a signal that is fed to gate 1525. This action again causes the memory output data register 1499 to be cleared, as described hereinabove, and also causes one shot 1529 to produce a pulse that will start a new memory writing cycle, as also described hereinabove.

The output signal from inverter 1517 is also fed to gate 1571. A signal traveling over BDB08 line 1569, signifying the control bit for the end of a document, is also fed to gate 1571. A signal over print all line 1534 is also fed to gate 1571. When the unit is in the print all mode and an "end of document" bit appears, gate 1571 outputs a signal that is fed to gate 1537. Gate 1537 feeds a signal to gate 1539. The output signal from gate 1539 is fed to one shot 1541, causing a carriage return signal to be generated as discussed in detail hereinabove. The output signal from gate 1537 is also fed to flip flop 1547, setting flip flop 1547 and whose output then is used to stop all further printout operations, as described in detail hereinabove.

While the invention has been described with reference to a preferred embodiment thereof, it will be apparent that various modifications can be made without departing from the spirit and scope of the invention.

I claim:

1. In an information storage and retrieval system comprising means for recording data bits on and reading data bits from a storage medium having a plurality of continuous recording tracks, each of said tracks having an area void of data bits preceding the position at which recording and reading of said data bits commence and being of sufficient length for recording a plurality of records in non-overlapping relation, each record including a number of data blocks comprising a plurality of said data bits serially arranged between respective data gaps; a device for locating a track on which the data blocks of at least one of said records can be recorded, said device comprising:

means for moving said recording and reading means and said storage medium relative to one another;

means operatively associated with said recording and reading means for sequentially searching said tracks and for generating a control signal when the first one of said tracks is located on which the last data block of a record has been recorded; and means responsive to said control signal for rendering said recording and reading means operative for recording the data bits comprising said data blocks in said first one of said tracks immediately following the data gap associated with said last data block as said recording and reading means and storage medium continue to move relative to each other.

2. An information storage and retrieval system in accordance with claim 1 wherein said storage medium comprises a magnetic medium.

3. An information storage and retrieval system in accordance with claim 1 wherein said storage medium comprises a magnetic disc.

4. An information storage and retrieval system in accordance with claim 1 wherein said locating device includes:

means responsive to said control signal for limiting the recording of said data blocks in said first one of said tracks to a number in accordance with the remaining unrecorded length thereof.

5. In an information storage and retrieval system comprising means for recording data bits on and reading data bits from a storage medium having a plurality of continuous recording tracks, each of said tracks having an area void of data bits preceding the position at which recording and reading of said data bits commence and being of sufficient length for recording a plurality of records in non-overlapping relation, each record including a number of data blocks comprising a plurality of said data bits serially arranged between respective data gaps; a device for locating a portion of one of said tracks on which the data bits of at least one additional data block can be recorded, said device comprising:

means for moving said recording and reading means and said storage medium relative to one another;

means operatively associated with said recording and reading means for sequentially searching said tracks and for generating a control signal when the first one of said tracks is located on which no data block has been recorded;

means responsive to said control signal for moving said recording and reading means into a position with respect to the last searched track having a data block recorded thereon; and means operatively associated with said recording and reading means and responsive to a first pass of the void area of said last searched track for initiating a count in one direction of the number of data blocks on said last searched track and responsive to a second pass of the void area of said last searched track for initiating a reverse count minus one of the number of data blocks to produce an output pulse for enabling a start signal on detecting the end of the last recorded data for recording said data bits of said additional data block.

6. An information storage and retrieval system in accordance with claim 5 wherein said counting means generates a first operating signal when the remaining length of said last searched track is sufficient to record the data bits of at least one additional data block and a second operating signal when the remaining length of said last searched track is insufficient to record the data bits of at least one additional data block;

7. An information storage and retrieval system in accordance with claim 6 including:

means responsive to said start signal and said first operating signal for rendering said recording and reading means operative for recording the data bits of at least one additional data block on said last searched track immediately following its respective last data gap as said recording and reading means and said storage medium continue to move relative to each other.

8. An information storage and retrieval system in accordance with claim 6, including:

means responsive to said second operating signal for repositioning said recording and reading means relative to said last searched track and for reinitiating said counting means to regenerate said output pulse for recording the data bits of at least one additional data block on said first one of said tracks immediately following its respective void area as said recording and reading means and said storage medium continue to move relative to each other.

9. An information storage and retrieval system in accordance with claim 6, including:

means responsive to detection of recorded data for generating a series of periodic electrical signals in synchronism with said recorded data, and an auxiliary counting means responsive to said series of electrical signals for generating said first operating signal when its count is less than said second operating signal and when its count is at least equal to a maximum allowable count which corresponds generally to a predetermined number of data bits storable on one of said tracks.

10. In an information storage and retrieval system comprising means for recording data bits on and reading data bits from a storage medium having a plurality of continuous recording tracks, each of said tracks having an area void of data bits preceding the position at which recording and reading of the data bits commence and a portion following said void area generally equivalent in length to that required for recording a predetermined number of serially arranged data bits as data blocks representative of a number of records, each of said data blocks comprising a variable number of data bits and not more than a maximum number of data bits serially arranged between data gaps of equal length; a device for locating the first one of said tracks on which data bits of at least one additional data block can be recorded, said device comprising:

means for moving said recording and reading means and said storage medium relative to one another;

means operatively associated with said recording and reading means for temporarily storing the data bits of said data block;

means operatively associated with said recording and reading means for sequentially searching said tracks and for generating a control signal when the first one of said tracks is located having a remaining length on which the data bits of said additional data block can be recorded; and means responsive to said control signal for rendering said recording and reading means operative and for effecting serial release of said data bits from said storing means so said data bits can be recorded in said first one of said tracks immediately following the last data block thereon as said recording and reading means and said storage medium continue to move relative to each other.

11. An information storage and retrieval system in accordance with claim 10 wherein said storage medium comprises a magnetic medium.

12. In an information storage and retrieval system comprising means for recording data bits on and reading data bits from a storage medium having a plurality of continuous recording tracks, each of said tracks having an area void of data bits preceding the position at which recording and reading of the data bits commence and a portion following said void area generally equivalent in length to that required for recording a predetermined number of serially arranged data bits as data blocks representative of a number of records, each of said data blocks comprising a variable number of data bits and not more than a maximum number of data bits serially arranged between data gaps of equal length; a device for locating a section on one of said tracks in which data bits of at least one additional data block can be recorded, said device comprising:

means for moving said recording and reading means and said storage medium relative to one another;

means operatively associated with said recording and reading means for temporarily storing the data bits of said additional data block;

reading means for sequentially searching said tracks and for generating a control signal when the first one of said tracks is located having a remaining length of which data bits of said additional data block can be recorded;

means responsive to said control signal for moving said recording and reading means into a position with respect to the last searched track having a data block recorded thereon;

means operatively associated with said recording and reading means and responsive to a first pass of the void area of said last searched track for initiating a count in one direction of the number of data gaps on said last searched track and responsive to a second pass of the void area of said last searched track for initiating a reverse count minus one of the number of data gaps to produce a pulse for enabling a start signal on detecting the end of the last recorded data block on said last searched track; and means responsive to said start signal for rendering said recording and reading means operative and for effecting serial release of said data bits from said temporary storing means so said data bits are recorded immediately following the last data gap on the last searched track as said recording and reading means and said storage medium continue to move relative to each other.

13. In an information storage and retrieval system comprising means for recording data bits on and reading data bits from a storage medium having a plurality of continuous recording tracks, each of said tracks having an area void of data bits preceding the position at which recording and reading of the data bits commence and a portion following said void area generally equivalent in length to that required for recording a predetermined number of serially arranged data bits as data blocks representative of a number of records, each of said data blocks comprising a variable number of data bits and not more than a maximum number of data bits serially arranged between data gaps of equal length; a device for locating a section on one of said tracks in which data bits of at least one additional data block can be recorded, said device comprising:

means for moving said recording and reading means and said storage medium relative to one another;

means operatively associated with said recording and reading means for temporarily storing the data bits of said additional data block;

means operatively associated with said recording and reading means for sequentially searching said tracks and for generating a control signal when the first one of said tracks is located on which no data block has been recorded;

means responsive to said control signal for repositioning said recording and reading means with respect to the last searched track having a data block recorded thereon;

means responsive to a first pass of the void area of said last searched track for initiating a count in one direction of the number of data gaps on said last searched track and responsive to a second pass of the void area of said last searched track for initiating a reverse count minus one of the number of data gaps and producing a signal upon completion of said reverse count;

means responsive to said control signal and detection of said first pass of said void area for generating a series of periodic electrical signals in synchronism with the relative movement of said recording means and reading means and said storage medium; and a counting means responsive to said series of electrical signals for generating a first operating signal indicative of sufficient length on said track to record the data bit of at least one additional data block and a second operating signal indicative of an insufficient length of track to record the data bits of at least one additional data block.

14. An information storage and retrieval system in accordance with claim 13, including:

means responsive to said second operating signal when generated with respect to the last of said tracks for indicating said storage medium is filled and for inhibiting the recording of any data bits.

15. An information storage and retrieval system in accordance with claim 13, including:

means responsive to said first opening signal for enabling a start signal on detecting the end of the last recorded data block; and means responsive to said start signal for rendering said recording and reading means operative and for effecting serial release of said data bits from said temporary storing means so said data bits are recorded immediately following the last data gap on the last searched track as said recording and reading means and said storage medium continue to move relative to each other.

16. An information storage and retrieval system in accordance with claim 13, including:

means responsive to said second operating signal for repositioning said recording and reading means relative to said first one of said tracks and for reinitiating said counting means to regenerate said enabling means for said start signal, whereby the data bits of at least one additional data block will be recorded on said first one of said tracks immediately following its respective void area as said recording and reading means and said storage means continue to move relative to each other.

17. In an information storage and retrieval system, a temporary memory comprising a plurality of elements for storing data bits representative of a predetermined number of words comprising a data block, each word comprising a predetermined number of characters, each of "n" data bits, and a group of command elements for determining the length of a data block, for indicating the result of a previous search comparison and a logical operator requirement, the improvement comprising:

means for selectively linking together the respective command elements of at least two words to provide for storing a single data block having an increased number of characters.

18. An information storage and retrieval system in accordance with claim 17, including:

means for controlling the serial entry of the characters of a word to be stored into the respective elements for said word and the parallel release of the data bits of a stored data block from its respective elements to a storage means.

19. An information storage and retrieval system in accordance with claim 17 wherein "n" designates any number of 1 through 6 data bits.

20. An information storage and retrieval system in accordance with claim 17 wherein the data bits of each character comprising a word are representative of natural language characters.

21. An information storage and retrieval system in accordance with claim 17, including:

means for imposing a logical operator requirement for all words of a data block.

22. An information storage and retrieval system in accordance with claim 17, including:

means for imposing a separate logical operator requirement for at least one word of a data block.

23. In an information storage and retrieval system having a storage medium on which data bits are recorded in a plurality of continuous tracks, each of said tracks comprising an area void of data bits preceding the position at which recording and reading of said data bits commence and followed by a number of records, each comprising a number of data blocks recorded in non-overlapping relation, each of said recorded data blocks comprising a plurality of data bits representative of at least one word of a predetermined number of characters, each of "n" data bits, serially arranged between respective data gaps, a device for locating on one of said tracks at least one of the recorded records which corresponds to the descriptor block of a requested record; said device comprising:

means arranged with respect to said storage medium for reading continuously and serially, the data bits comprising each recorded data block on each track as said storage medium means move relative to each other;

serial shift register means responsive to said reading means for serially receiving the data bits of each of said data blocks and for releasing in parallel as a medium word said same data bits;

means comprising a plurality of elements for temporarily storing the data bits of at least one search word comprising the search descriptors identifying said requested record, each search word including a number of said elements associated with each search word character, for storing a data bit identifying the first search word of said search descriptors, for storing a data bit identifying the last search word of said search descriptors, for entry and storing of a data bit to link at least two search words together and for a group of data bits determining the search logic;

holding register means operatively associated with said serial shift register means for storing the data bits of each medium word comprising a recorded data block;

means responsive to detection of recorded data for generating a series of periodic pulses having a frequency in synchronism with the movement of the track data bits relative to said reading means;

means responsive to a first predetermined number of said periodic pulses for enabling said holding register means to receive the stored data bits in parallel from said serial shift register means;

means responsive to a second predetermined number of said periodic pulses for enabling said periodic pulses to address all word storage elements of said temporary storing means;

means initiated by said data gap and responsive to the first predetermined number of said periodic pulses for counting the number of medium words in each data block recorded on said storage medium;

means initiated by the data bit identifying the first search word of a search descriptor and responsive to the addressing of said temporary storing means for counting the number of search words within each search descriptor;

means operatively associated with medium word counter means and said search word counter means for determining agreement therebetween;

means operatively associated with said temporary storing means and said holding register means for determining the logic condition existing between said medium word and said search word;

means operatively associated with said temporary storing means and responsive to said group of data bits for imposing one of a logical operator requirement for all search words of a search descriptor and of a separate logical operator requirement for at least one search word of a search descriptor;

means operatively associated with said temporary storing means and responsive to said search logic data bits for determining agreement between the requested logic condition and said existing logic condition;

means operatively associated with said temporary storage means and responsive to said logic condition agreement, said word count agreement, and one of said first search word data bit and of a linking data bit for determining agreement between said search word and said medium word;

means operatively associated with said temporary storing means and responsive to agreement between said search word and said medium word for entering and storing a linking data bit in the one of said storing elements associated with the next search word in said temporary storing means; and means responsive to said least search word data bit and said data gap following the end of said last medium word for indicating complete satisfaction of said search descriptor.

24. An information storage and retrieval system in accordance with claim 23 wherein the descriptor data block of a requested record includes at least one irrelevant character represented by data bits, and including means responsive to said comparing means for indicating agreement between the released data bits of one of said recorded data blocks, excluding the character corresponding to said irrelevant character, and the released data bits of the descriptor data block of said requested record.

25. An information storage and retrieval system in accordance with claim 23, including:

means operatively associated with said temporary storing means for counting the number of search descriptors entered therein;

means operatively associated with said temporary storing means for counting the number of complete satisfactions of said search descriptor;

means responsive to said search descriptor counter and said satisfactions counter for comparing and indicating record agreements with equal count; and means responsive to said comparing and indicating means for counting and visually indicating the number of record satisfactions.

26. An information storage and retrieval system in accordance with claim 25, including:

means responsive to said comparing means, when said search request contains two descriptor data blocks, for indicating that a recorded record has been located having data blocks within which there is agreement with one of the two descriptor data blocks.

27. An information storage and retrieval system in accordance with claim 25, including:

means responsive to said comparing means, when said search request contains a number of descriptor data blocks for indicating that a recorded record has been located having data blocks within which there is agreement with only one of said number of descriptor data blocks.

28. An information storage and retrieval system in accordance with claim 23, including:

means responsive to said comparing means, when said search request contains a descriptor data block, for indicating that one or more recorded records have been located having data blocks within which there is agreement with a selected portion of said descriptor data block.

29. An information storage and retrieval system in accordance with claim 25, including:

means responsive to said comparing means and said counting means, when said search request contains a number of descriptor data blocks, for indicating that a recorded record has been located having data blocks within which there is agreement with a selected number of said descriptor data blocks.

30. An information storage and retrieval system in accordance with claim 23, including:

second means for temporarily storing the data bits of each of the characters in the data blocks comprising a recorded record; and means responsive to said comparing and indicating means for releasing the data bits from said second temporary storing means to display the recorded record satisfying the search request.

31. An information storage and retrieval system in accordance with claim 30, including:

means operatively associated with the storing means for said record data bits and responsive to said operating signal for visually displaying in natural language the information recorded in the data blocks of the record stored therein.

32. An information storage and retrieval system in accordance with claim 30, including:

means responsive to said operating signal for discontinuing the search request while a record is being displayed and, upon completion of the record display, for continuing said search with the record adjacent that last displayed.

33. An information storage and retrieval system with accordance with claim 31, including:

means operatively associated with said storing means for said record data bits and responsive to said operating signal for controlling selectively the visual display of one of the record title block and of the record title block and data blocks.

34. An information storage and retrieval system in accordance with claim 31, wherein said visually displaying means comprises a typewriter print-out.

35. An information storage and retrieval system in accordance with claim 31, wherein said visually displaying means comprises a cathode ray tube.

36. An information storage and retrieval system in accordance with claim 30, including:

means operatively associated with said temporary storing means and responsive to said operating signal for recording binarily on magnetic tape the data bits of an agreement record.

37. An information storage and retrieval system in accordance with claim 25, including:

means responsive to said comparing means and said counting means for negating the search result with respect to a recorded record containing a specified search request descriptor.

38. An information storage and retrieval system in accordance with claim 13, including:

means responsive to the position of said recording and reading means relative to a track on said storage medium of a predetermined number for indicating the next to last track on which data bits can be recorded; and means responsive to movement of said reading and recording means relative to said last track for permitting the carry-over and completion of the recording of the data bits associated with the last record started on said next to last track and only the first data block of a new record and for inhibiting any further recording thereafter.

* * * * *